United States Patent
Hu et al.

(10) Patent No.: US 12,250,594 B2
(45) Date of Patent: Mar. 11, 2025

(54) HISTORY INFORMATION RECORDING METHOD AND APPARATUS, AND COMPUTER-READABLE STORAGE MEDIUM

(71) Applicant: Huawei Technologies Co., Ltd., Shenzhen (CN)

(72) Inventors: Xingxing Hu, Shanghai (CN); Hongping Zhang, Shenzhen (CN); Xiaoli Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 17/670,798

(22) Filed: Feb. 14, 2022

(65) Prior Publication Data
US 2022/0167215 A1   May 26, 2022

Related U.S. Application Data

(63) Continuation of application No. PCT/CN2020/107879, filed on Aug. 7, 2020.

(30) Foreign Application Priority Data

Aug. 15, 2019   (CN) .......................... 201910755418.6

(51) Int. Cl.
*H04W 36/00* (2009.01)
*H04W 4/02* (2018.01)
(Continued)

(52) U.S. Cl.
CPC ....... *H04W 36/0016* (2013.01); *H04W 4/027* (2013.01); *H04W 24/10* (2013.01); *H04W 36/0085* (2018.08); *H04W 88/06* (2013.01)

(58) Field of Classification Search
CPC ......... H04W 36/0016; H04W 36/0085; H04W 4/027; H04W 24/10; H04W 88/06
See application file for complete search history.

(56) References Cited

U.S. PATENT DOCUMENTS 9,763,162 B2   9/2017 Axmon et al.
10,582,523 B2   3/2020 Kubota et al.
(Continued)

FOREIGN PATENT DOCUMENTS

CN   104468029 A   3/2015
CN   104811924 A   7/2015
(Continued)

OTHER PUBLICATIONS

3GPP TS 37.340 V15.6.0 (Jun. 2019), 3rd Generation Partnership Project; Technical Specification Group Radio Access Network; Evolved Universal Terrestrial Radio Access (E-UTRA) and NR; Multi-connectivity; Stage 2 (Release 15), 69 pages.
(Continued)

*Primary Examiner* — Samina F Choudhry
(74) *Attorney, Agent, or Firm* — SLATER MATSIL LLP

(57) ABSTRACT

A history information recording method, including obtaining, by a current secondary node, information about a history cell that a terminal device visits, where the information about the history cell comprises at least one of stay time of the terminal device in the history or moving speed information of the terminal device in the history cell, and performing, by the current secondary node, handover preparation based on the information about the history cell.

20 Claims, 14 Drawing Sheets

(51) Int. Cl.
*H04W 24/10* (2009.01)
*H04W 88/06* (2009.01)

(56) References Cited

U.S. PATENT DOCUMENTS

| | | | |
|---|---|---|---|
| 11,051,155 | B2 | 6/2021 | Mochizuki et al. |
| 11,057,783 | B2 | 7/2021 | Lin |
| 2010/0272050 | A1* | 10/2010 | Lim .................. H04W 8/22 370/329 |
| 2013/0231116 | A1* | 9/2013 | Mildh ............ H04W 36/0055 455/436 |
| 2015/0230134 | A1 | 8/2015 | Chiba et al. |
| 2016/0021585 | A1 | 1/2016 | Pedersen et al. |
| 2016/0242077 | A1 | 8/2016 | Horneman et al. |
| 2016/0242224 | A1 | 8/2016 | Liu et al. |
| 2016/0338131 | A1 | 11/2016 | Godin et al. |
| 2016/0374000 | A1 | 12/2016 | Kim et al. |

FOREIGN PATENT DOCUMENTS

| | | | | |
|---|---|---|---|---|
| CN | 106576255 | A | | 4/2017 |
| CN | 107258104 | A | | 10/2017 |
| CN | 107810658 | A | | 3/2018 |
| CN | 109565727 | A | | 4/2019 |
| CN | 109756924 | A | | 5/2019 |
| CN | 112135332 | A | * | 12/2020 ........... H04L 5/0053 |
| EP | 2903386 | A1 | | 8/2015 |
| EP | 3525515 | A1 | | 8/2019 |
| WO | 2016162045 | A1 | | 10/2016 |
| WO | WO-2018155918 | A1 | * | 8/2018 ............ H04B 7/063 |
| WO | 2018170746 | A1 | | 9/2018 |

OTHER PUBLICATIONS

3GPP TS 38.331 V15.6.0 (Jun. 2019), 3rd Generation Partnership Project; Technical Specification Group Radio Access Network; NR; Radio Resource Control (RRC) protocol specification(Release 15), 519 pages.
3GPP TS 38.413 V15.4.0 (Jul. 2019), 3rd Generation Partnership Project; Technical Specification Group Radio Access Network; NG-RAN; NG Application Protocol (NGAP) (Release 15), 328 pages.
"UE Assistance for Mobility," Agenda Item: 7.2.1, Source: Nokia Corporation, Nokia Siemens Network, Document for: Discussion and Decision, R2-122516, XP050607301, 3GPP TSG-RAN WG2 Meeting #78, May 21-25, 2012, 4 pages.
"Speed Dependent Procedures for Inter-RAT Mobility," Agenda Item: 10.2.11, Source: Samsung, Document for: Discussion, 3GPP TSG-RAN WG2#NR_AdHoc#2 Meeting, R2-1707093, XP051301586, Jun. 27-29, 2017, 2 pages.
"3rd Generation Partnership Project; Technical Specification Group Services and System Aspects; Architecture enhancements for 5G System (5GS) to support network data analytics services (Release 16)," 3GPP TS 23.288 V16.0.0, Jun. 2019, 52 pages.
"3rd Generation Partnership Project; Technical Specification Group Services and System Aspects; Management and orchestration; 5G performance measurements (Release 16)," 3GPP TS 28.552 V16.2.0, Jun. 2019, 98 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.6.0, Jun. 2019, 365 pages.
"3rd Generation Partnership Project; Technical Specification Group Radio Access Network; Evolved Universal Terrestrial Radio Access (E-UTRA); User Equipment (UE) procedures in idle mode(Release 15)," 3GPP TS 36.304 V15.4.0, Jun. 2019, 55 pages.
"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413 V15.6.0, Jul. 2019, 388 pages.
"3rd Generation Partnership Project; Technical Specification Group Radio Access Network; NG-RAN; Xn application protocol (XnAP) (Release 15)," 3GPP TS 38.423 V15.4.0, Jul. 2019, 309 pages.
"UE Throughput History Information," Agenda item: 20.4.3, Source: Nokia Networks, NTT DOCOMO, Inc., China Telecom, China Unicom, Document for: Discussion and approval, 3GPP TSG-RAN WG3 Meeting #87bis, R3-150527, Santa Cruz, Tenerife, Spain, Apr. 20-24, 2015, 3 pages.
"Collected Corrections for XnAP Version 15.0.0," Ericsson, R3, NR_newRAT-Core, Jul. 11, 2018, F, Rel-15, Change Request, 38.423, CR 0008, rev, Current version: 15.0.0, 3GPP TSG-RAN WG3 NR AH 1807 Meeting, R3-184390, Montreal, Canada, Jul. 2-6, 2018, 119 pages.
"Collected Corrections for XnAP Version 15.0.0." Source to WG: Ericsson, Source to TSG: R3, Work Item Code: NR-newRAT-Core, Date: Aug. 10, 2018, Category: F, Release: Rel-15, 3GPP TSG-RAN WG3 Meeting #101, R3-185321Gothenburg, Sweden, Aug. 20-24, 2018, 222 pages.

* cited by examiner

HISTORY INFORMATION RECORDING METHOD AND APPARATUS, AND COMPUTER-READABLE STORAGE MEDIUM

CROSS-REFERENCE TO RELATED APPLICATIONS

This application is a continuation of International Application No. PCT/CN2020/107879, filed on Aug. 7, 2020, which claims priority to Chinese Patent Application No. 201910755418.6, filed on Aug. 15, 2019. The disclosures of the aforementioned applications are hereby incorporated by reference in their entireties.

TECHNICAL FIELD

This application relates to the communications field, and more specifically, to a history information recording method and apparatus, and a computer-readable storage medium.

BACKGROUND

In a process in which a terminal device communicates with a base station, the terminal device records visited cell information. After obtaining the visited cell information of the terminal device, the base station may optimize movement of the terminal device based on the visited cell information of the terminal device, or may deliver a measurement configuration based on the visited cell information of the terminal device in a handover process.

In a dual connectivity (DC) scenario, in addition to a master base station, a secondary base station may also trigger the terminal device to perform handover. For example, the secondary base station may trigger the terminal device to hand over between a plurality of secondary base stations, or may trigger the terminal device to hand over between cells of the secondary base station.

Therefore, how to process history information of the terminal device in the DC scenario becomes an urgent problem that needs to be resolved currently.

SUMMARY

This application provides a history information recording method and apparatus, and a computer-readable storage medium. A secondary base station may configure some related measurement parameters based on a speed at which a terminal device visits a history cell and stay time of the terminal device in the history cell, to indicate the secondary base station to trigger the terminal device to perform handover preparation.

According to a first aspect, a history information recording method is provided, including: A current secondary node obtains information about a history cell that a terminal device visits, where the information about the history cell includes stay time of the terminal device in the history cell and/or moving speed information of the terminal device in the history cell, and the current secondary node performs handover preparation based on the information about the history cell.

In the foregoing technical solution, the secondary node may obtain the stay time of the terminal device in the history cell and/or the moving speed information of the terminal device in the history cell, and may accurately configure some related measurement parameters based on the foregoing information, to indicate a secondary base station to trigger the terminal device to perform handover preparation.

In a possible implementation, the current secondary node receives the information about the history cell from the terminal device or a current master node.

In another possible implementation, the history cell includes one or more history primary secondary cells, and the one or more history primary secondary cells include a primary secondary cell of one or more history secondary nodes and/or the current secondary node.

In another possible implementation, information about the one or more history primary secondary cells is recorded by the terminal device.

In another possible implementation, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

In another possible implementation, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

In another possible implementation, the information about the history cell further includes radio resource control RRC state information of the terminal device in the history cell, and the RRC state information includes a connected state, an idle state, or an inactive state.

In another possible implementation, the history cell includes one or more history primary secondary cells, and the one or more history primary secondary cells include a primary secondary cell of one or more history secondary nodes.

In another possible implementation, information about the one or more history primary secondary cells is recorded by the one or more history secondary nodes.

In another possible implementation, the method further includes: The current secondary node receives the information about the one or more history primary secondary cells from a current master node.

In another possible implementation, the one or more history primary secondary cells further include a primary secondary cell of the current secondary node.

In another possible implementation, information about the primary secondary cell of the current secondary node is recorded by the current secondary node.

In another possible implementation, the method further includes: The current secondary node sends the information about the history cell to the current master node.

In another possible implementation, the information about the history cell further includes RRC state information of the terminal device in the history cell, and the RRC state information includes a connected state.

In another possible implementation, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

In another possible implementation, based on the information about the history cell, the secondary node delivers a measurement configuration or determines whether to perform handover.

In another possible implementation, the information about the history cell further includes beam information of the terminal device in the history cell.

In another possible implementation, the information about the history cell includes one or more of the following: a global cell identity GCI of the history cell, a physical cell identity PCI of the history cell, and a frequency of the history cell.

According to a second aspect, a history information recording method is provided, including: A terminal device records information about a history cell that the terminal device visits, where the information about the history cell includes stay time of the terminal device in the history cell and/or moving speed information of the terminal device in the history cell, the history cell includes one or more history primary secondary cells, and the one or more history primary secondary cells include a primary secondary cell of one or more history secondary nodes and/or a current secondary node, and the terminal device sends the information about the history cell to the current secondary node.

In a possible implementation, the terminal device first sends the information about the history cell to a current master node MN, and transparently transmits the information to the current secondary node by using the master node MN.

In another possible implementation, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

In another possible implementation, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

In another possible implementation, the information about the history cell further includes radio resource control RRC state information of the terminal device in the history cell, and the RRC state information includes a connected state, an idle state, or an inactive state.

In another possible implementation, the information about the history cell further includes beam information of the terminal device in the history cell.

In another possible implementation, the information about the history cell includes one or more of the following: a global cell identity GCI of the history cell, a physical cell identity PCI of the history cell, and a frequency of the history cell.

According to a third aspect, a history information recording method is provided, including: A master node obtains information about a history cell that a terminal device visits, where the information about the history cell includes stay time of the terminal device in the history cell and/or moving speed information of the terminal device in the history cell, and the master node sends the information about the history cell to a secondary node.

In another possible implementation, the master node receives the information about the history cell from the terminal device.

In another possible implementation, information about the one or more history primary secondary cells is recorded by the terminal device.

In another possible implementation, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

In another possible implementation, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

In another possible implementation, the information about the history cell further includes radio resource control RRC state information of the terminal device in the history cell, and the RRC state information includes a connected state, an idle state, or an inactive state.

In another possible implementation, the method further includes: The master node receives the information about the history cell sent by the secondary node.

In another possible implementation, the information about the history cell further includes beam information of the terminal device in the history cell.

In another possible implementation, the information about the history cell includes one or more of the following: a global cell identity GCI of the history cell, a physical cell identity PCI of the history cell, and a frequency of the history cell.

According to a fourth aspect, a history information recording apparatus is provided, including a module, a component, or a circuit configured to implement the method according to the first aspect.

It may be understood that the history information recording apparatus according to the fourth aspect may be a secondary node, or may be a component (for example, a chip or a circuit) that may be used in a secondary node.

According to a fifth aspect, a history information recording apparatus is provided, including a module, a component, or a circuit configured to implement the method according to the second aspect.

It may be understood that the history information recording apparatus according to the fifth aspect may be a terminal device, or may be a component (for example, a chip or a circuit) that may be used in a terminal device.

According to a sixth aspect, a history information recording apparatus is provided, including a module, a component, or a circuit configured to implement the method according to the third aspect.

It may be understood that the history information recording apparatus according to the sixth aspect may be a master node, or may be a component (for example, a chip or a circuit) that may be used in a master node.

According to a seventh aspect, a secondary node is provided. The secondary node includes: an obtaining module, configured to obtain information about a history cell that a terminal device visits, where the information about the history cell includes stay time of the terminal device in the history cell and/or moving speed information of the terminal device in the history cell, and a processing module, configured to perform handover preparation based on the information about the history cell.

In the foregoing technical solution, the secondary node may obtain the stay time of the terminal device in the history cell and/or the moving speed information of the terminal device in the history cell, and may accurately configure some related measurement parameters based on the foregoing information, to indicate a secondary base station to trigger the terminal device to perform handover preparation.

In a possible implementation, the obtaining module is specifically configured to receive the information about the history cell from the terminal device or a current master node.

In another possible implementation, the history cell includes one or more history primary secondary cells, and the one or more history primary secondary cells include a primary secondary cell of one or more history secondary nodes and/or the current secondary node.

In another possible implementation, information about the one or more history primary secondary cells is recorded by the terminal device.

In another possible implementation, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

In another possible implementation, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

In another possible implementation, the information about the history cell further includes radio resource control RRC state information of the terminal device in the history cell, and the RRC state information includes a connected state, an idle state, or an inactive state.

In another possible implementation, the history cell includes one or more history primary secondary cells, and the one or more history primary secondary cells include a primary secondary cell of one or more history secondary nodes.

In another possible implementation, information about the one or more history primary secondary cells is recorded by the one or more history secondary nodes.

In another possible implementation, the obtaining module is further configured to receive the information about the one or more history primary secondary cells from a current master node.

In another possible implementation, the one or more history primary secondary cells further include a primary secondary cell of the current secondary node.

In another possible implementation, information about the primary secondary cell of the current secondary node is recorded by the current secondary node.

In a possible implementation, the secondary node further includes: a sending module, configured to send the information about the history cell to the current master node.

In another possible implementation, the information about the history cell further includes RRC state information of the terminal device in the history cell, and the RRC state information includes a connected state.

In another possible implementation, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

In another possible implementation, the processing module is specifically configured to: based on the information about the history cell, deliver a measurement configuration or determine whether to perform handover.

In another possible implementation, the information about the history cell further includes beam information of the terminal device in the history cell.

In another possible implementation, the information about the history cell includes one or more of the following: a global cell identity GCI of the history cell, a physical cell identity PCI of the history cell, and a frequency of the history cell.

According to an eighth aspect, a terminal device is provided, including: a recording module, configured to record information about a history cell that the terminal device visits, where the information about the history cell includes stay time of the terminal device in the history cell and/or moving speed information of the terminal device in the history cell, the history cell includes one or more history primary secondary cells, and the one or more history primary secondary cells include a primary secondary cell of one or more history secondary nodes and/or a current secondary node, and a sending module, configured to send the information about the history cell to the current secondary node.

In a possible implementation, the terminal device first sends the information about the history cell to a current master node MN, and transparently transmits the information to the current secondary node by using the master node MN.

In another possible implementation, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

In another possible implementation, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

In another possible implementation, the information about the history cell further includes radio resource control RRC state information of the terminal device in the history cell, and the RRC state information includes a connected state, an idle state, or an inactive state.

In another possible implementation, the information about the history cell further includes beam information of the terminal device in the history cell.

In another possible implementation, the information about the history cell includes one or more of the following: a global cell identity GCI of the history cell, a physical cell identity PCI of the history cell, and a frequency of the history cell.

According to a ninth aspect, a master node is provided, including: an obtaining module, configured to obtain information about a history cell that a terminal device visits, where the information about the history cell includes stay time of the terminal device in the history cell and/or moving speed information of the terminal device in the history cell, and a sending module, configured to send the information about the history cell to a secondary node.

In another possible implementation, the obtaining module is specifically configured to receive the information about the history cell from the terminal device.

In another possible implementation, information about the one or more history primary secondary cells is recorded by the terminal device.

In another possible implementation, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

In another possible implementation, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

In another possible implementation, the information about the history cell further includes radio resource control RRC state information of the terminal device in the history cell, and the RRC state information includes a connected state, an idle state, or an inactive state.

In another possible implementation, the obtaining module is configured to receive the information about the history cell sent by the secondary node.

In another possible implementation, the information about the history cell further includes beam information of the terminal device in the history cell.

In another possible implementation, the information about the history cell includes one or more of the following: a global cell identity GCI of the history cell, a physical cell identity PCI of the history cell, and a frequency of the history cell.

According to a tenth aspect, a history information recording apparatus is provided. The history information recording apparatus provided in this application has a function of implementing behavior of a secondary node in the foregoing method, and includes corresponding means configured to perform the steps or functions described in the foregoing method. The steps or functions may be implemented by software, hardware (such as a circuit), or a combination of hardware and software. The history information recording apparatus may be a chip or the like.

In a possible design, the history information recording apparatus includes one or more processors. The one or more processors are configured to support the history information recording apparatus to perform a corresponding function of the secondary node in the foregoing method.

Optionally, the history information recording apparatus may further include one or more memories. The memory is configured to be coupled to the processor, and the memory stores program instructions and/or data necessary for the history information recording apparatus. The one or more memories may be integrated with the processor, or may be disposed independent of the processor. This is not limited in this application.

The memory may be an internal storage unit of the processor, may be an external storage unit independent of the processor, or may be a component including an internal storage unit of the processor and an external storage unit independent of the processor.

Optionally, the processor may be a general-purpose processor, and may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

Optionally, the history information recording apparatus may further include one or more communications units, and the communications unit may be a transceiver or a transceiver circuit. Optionally, the transceiver may alternatively be an input/output circuit or an interface.

In another possible design, the history information recording apparatus includes a transceiver, a processor, and a memory. The processor is configured to control the transceiver or an input/output circuit to receive and send a signal, and the memory is configured to store computer programs. The processor is configured to run the computer programs in the memory, to enable the history information recording apparatus to perform the method completed by the secondary node in any one of the first aspect and the possible implementations of the first aspect.

According to an eleventh aspect, a history information recording apparatus is provided. The history information recording apparatus provided in this application has a function of implementing behavior of a terminal device in the foregoing method, and includes corresponding means configured to perform the steps or functions described in the foregoing method. The steps or functions may be implemented by software, hardware (such as a circuit), or a combination of hardware and software. The history information recording apparatus may be a chip or the like.

In a possible design, the history information recording apparatus includes one or more processors. The one or more processors are configured to support the history information recording apparatus to perform a corresponding function of the terminal device in the foregoing method.

Optionally, the history information recording apparatus may further include one or more memories. The memory is configured to be coupled to the processor, and the memory stores program instructions and/or data necessary for the history information recording apparatus. The one or more memories may be integrated with the processor, or may be disposed independent of the processor. This is not limited in this application.

The memory may be an internal storage unit of the processor, may be an external storage unit independent of the processor, or may be a component including an internal storage unit of the processor and an external storage unit independent of the processor.

Optionally, the processor may be a general-purpose processor, and may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

Optionally, the history information recording apparatus may further include one or more communications units, and the communications unit may be a transceiver or a transceiver circuit. Optionally, the transceiver may alternatively be an input/output circuit or an interface.

In another possible design, the history information recording apparatus includes a transceiver, a processor, and a memory. The processor is configured to control the transceiver or an input/output circuit to receive and send a signal, and the memory is configured to store computer programs. The processor is configured to run the computer programs in the memory, to enable the history information recording apparatus to perform the method completed by the terminal device in any one of the second aspect and the possible implementations of the second aspect.

According to a twelfth aspect, a history information recording apparatus is provided. The history information recording apparatus provided in this application has a function of implementing behavior of a master node in the foregoing method, and includes corresponding means configured to perform the steps or functions described in the foregoing method. The steps or functions may be implemented by software, hardware (such as a circuit), or a combination of hardware and software. The history information recording apparatus may be a chip or the like.

In a possible design, the history information recording apparatus includes one or more processors. The one or more processors are configured to support the history information recording apparatus to perform a corresponding function of the master node in the foregoing method.

Optionally, the history information recording apparatus may further include one or more memories. The memory is configured to be coupled to the processor, and the memory stores program instructions and/or data necessary for the history information recording apparatus. The one or more memories may be integrated with the processor, or may be disposed independent of the processor. This is not limited in this application.

The memory may be an internal storage unit of the processor, may be an external storage unit independent of the processor, or may be a component including an internal storage unit of the processor and an external storage unit independent of the processor.

Optionally, the processor may be a general-purpose processor, and may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

Optionally, the history information recording apparatus may further include one or more communications units, and the communications unit may be a transceiver or a transceiver circuit. Optionally, the transceiver may alternatively be an input/output circuit or an interface.

In another possible design, the history information recording apparatus includes a transceiver, a processor, and a memory. The processor is configured to control the transceiver or an input/output circuit to receive and send a signal, and the memory is configured to store computer programs. The processor is configured to run the computer programs in the memory, to enable the history information recording apparatus to perform the method completed by the master node in any one of the third aspect and the possible implementations of the third aspect.

According to a thirteenth aspect, a computer-readable storage medium is provided, including a computer program. When the computer program is run on a terminal device, the history information recording apparatus is enabled to perform the method according to any one of the first aspect and the implementations of the first aspect.

According to a fourteenth aspect, a computer-readable storage medium is provided, including a computer program. When the computer program is run on a communications apparatus, the history information recording apparatus is enabled to perform the method according to any one of the second aspect and the implementations of the second aspect.

According to a fifteenth aspect, a computer-readable storage medium is provided, including a computer program. When the computer program is run on a communications apparatus, the history information recording apparatus is enabled to perform the method according to any one of the third aspect and the implementations of the third aspect.

According to a sixteenth aspect, a computer program product is provided, and when the computer program product is run on a computer, the computer is enabled to perform the method according to any one of the first aspect and the implementations of the first aspect.

According to a seventeenth aspect, a computer program product is provided, and when the computer program product is run on a computer, the computer is enabled to perform the method according to any one of the second aspect and the implementations of the second aspect.

According to an eighteenth aspect, a computer program product is provided, and when the computer program product is run on a computer, the computer is enabled to perform the method according to any one of the third aspect and the implementations of the third aspect.

DETAILED DESCRIPTION OF ILLUSTRATIVE EMBODIMENTS

Figure 1:
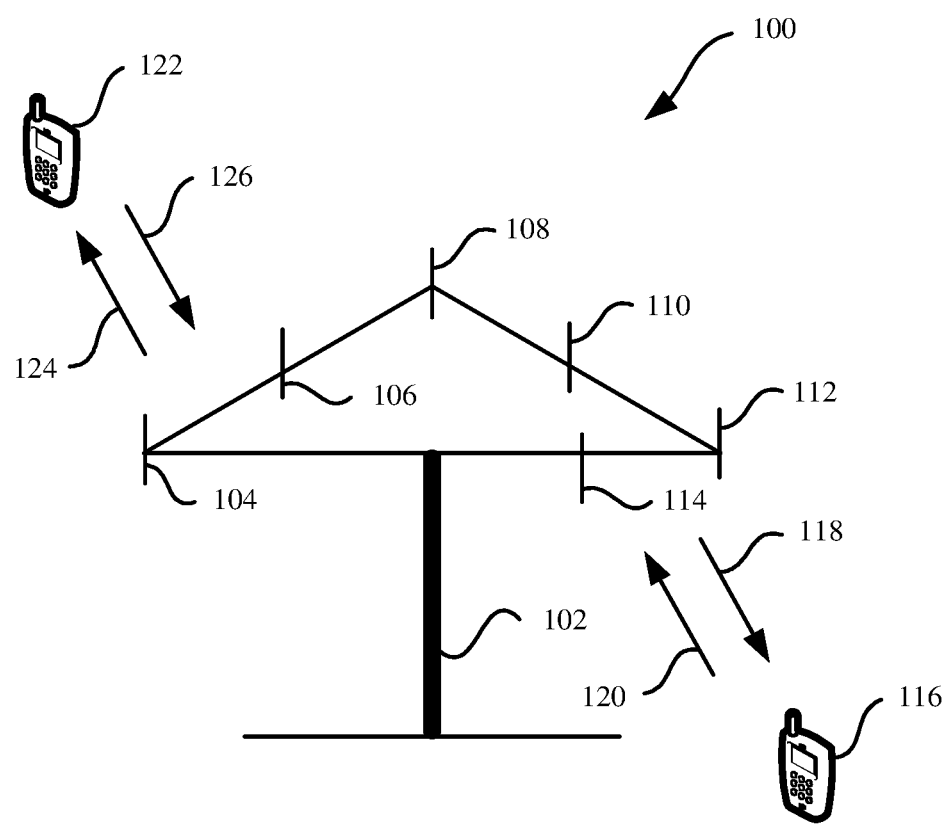
FIG. 1 is a schematic diagram of a scenario of a communications system 100 to which embodiments of this application are applicable.

The following describes technical solutions of this application with reference to the accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

A type of a terminal device is not specifically limited in the embodiments of this application. For example, the terminal device may be user equipment (UE), an access terminal, a subscriber unit, a subscriber station, a mobile station, a mobile console, a remote station, a remote terminal, a mobile device, a user terminal, a wireless network device, a user agent, or a user apparatus. The terminal may include but is not limited to a mobile station (MS), a mobile telephone, user equipment (UE), a handset, portable equipment, a cellular phone, a cordless phone, a session initiation protocol (SIP) phone, a wireless local loop (WLL) station, a personal digital assistant (PDA), a radio frequency identification (RFID) terminal device for logistics, a handheld device or a computing device that has a wireless communication function, another device connected to a wireless modem, an in-vehicle device, a wearable device, a terminal device in an Internet of things or an Internet of vehicles, a terminal device in a future 5G network, a terminal device in a future evolved public land mobile network (public land mobile network, PLMN), or the like.

By way of example but not limitation, the terminal device in the embodiments of this application may alternatively be a wearable device. The wearable device may also be referred to as a wearable intelligent device, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, for example, smartwatches or smart glasses, and devices that focus on only one type of application function and need to work with other devices such as smartphones, for example, various smart bands or smart jewelry for monitoring physical signs.

A type of a network device is not specifically limited in the embodiments of this application. The network device may be any device configured to communicate with the terminal device. For example, the network device may be a base transceiver station (base transceiver station, BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in a long term evolution (LTE) system, or may be a radio controller in a cloud radio access network (CRAN) scenario. Alternatively, the network device may be, for example, a relay station, an access point, an in-vehicle device, a wearable device, a network device in a future 5G network, or a network device in a future evolved PLMN network.

In addition, in the embodiments of this application, the network device serves a cell, and the terminal device communicates with the network device by using a transmission resource (for example, a frequency domain resource or a spectrum resource) used in the cell. The cell may be a cell corresponding to the network device (for example, a base station). The cell may belong to a macro base station, or may belong to a base station corresponding to a small cell. Herein, the small cell may include: a metro cell, a micro cell, a pico cell, a femto cell, and the like, and the small cell has features of small coverage and low transmit power, and is applicable to providing a high-rate data transmission service.

A method provided in the embodiments of this application may be applied to the terminal device or the network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a UNIX operating system, an Android operating system, an iOS operating system, or a Windows operating system. The application layer includes applications such as a browser, an address book, word processing software, and instant messaging software. In addition, a specific structure of an execution body of a signal transmission method in the embodiments of this application is not specifically limited in the embodiments of this application, provided that a program that records code of the method in the embodiments of this application can be run to perform communications according to the method in the embodiments of this application. For example, the execution body of the method in the embodiments of this application may be the terminal device or the network device, or a function module that can invoke and execute the program in the terminal device or the network device.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a wireless channel, and various other media that can store, include, and/or carry instructions and/or data.

FIG. 1 is a schematic diagram of a scenario of a communications system 100 to which embodiments of this application are applicable. As shown in FIG. 1, a communications system 100 includes a network device 102, and the network device 102 may include a plurality of antenna groups. Each antenna group may include a plurality of antennas. For example, one antenna group may include antennas 104 and 106, another antenna group may include antennas 106 and 110, and an additional group may include antennas 112 and 114. FIG. 1 shows two antennas for each antenna group, but each group may include more or fewer antennas. The network device 102 may additionally include a transmitter chain and a receiver chain, and a person of ordinary skill in the art may understand that both of them may include a plurality of components (for example, a processor, a modulator, a multiplexer, a demodulator, a demultiplexer, and an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or the terminal device 122. The terminal devices 116 and 122 each may be, for example, a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal device 116 communicates with the antennas 112 and 114. The antennas 112 and 114 send information to the terminal device 116 through a forward link 116, and receive information from the terminal device 116 through a reverse link 120. In addition, the terminal device 122 communicates with the antenna 104 and the antenna 106. The antenna 104 and the antenna 106 each send information to the terminal device 122 over a forward link 124, and receive information from the terminal device 122 over a reverse link 126.

For example, in a frequency division duplex (FDD) system, for example, the forward link 116 may use a frequency band different from that used by the reverse link 120, and the forward link 124 may use a frequency band different from that used by the reverse link 126.

For another example, in a time division duplex (TDD) system and a full duplex (full duplex) system, the forward link 116 and the reverse link 120 may use a same frequency band, and the forward link 124 and the reverse link 126 may use a same frequency band.

Each antenna group and/or each area that are/is designed for communication are/is referred to as a sector of the network device 102. For example, the antenna group may be designed to communicate with a terminal device in a sector of a coverage area of the network device 102. In a process in which the network device 102 communicates with the terminal devices 116 and 122 through the forward links 116 and 124 respectively, a transmit antenna of the network device 102 may improve signal-to-noise ratios of the forward links 116 and 124 through beamforming. In addition, when the network device 102 sends, through beamforming, signals to the terminal device 116 and the terminal device 122 that are randomly scattered in a related coverage area, interference to a mobile device in a neighboring cell is less than that caused when a network device sends signals to all terminal devices of the network device by using a single antenna.

Within a given time, the network device 102, the terminal device 116, or the terminal device 122 may be a wireless communication sending apparatus and/or a wireless communication receiving apparatus. When sending data, the wireless communications sending apparatus may encode data for transmission. Specifically, the wireless communications sending apparatus may obtain (for example, generate, receive from another communications apparatus, or store in a memory) a specific quantity of data bits to be sent on a channel to the wireless communications receiving apparatus. The data bits may be included in a transport block (or a plurality of transport blocks) of the data, and the transport block may be segmented to generate a plurality of code blocks.

In addition, the communications system 100 may be a public land mobile network PLMN network, a device-to-device (D2D) network, a machine-to-machine (M2M) network, or another network. FIG. 1 is merely a simplified schematic diagram of an example for ease of understanding. The network may further include another network device that is not shown in FIG. 1.

Figure 2:
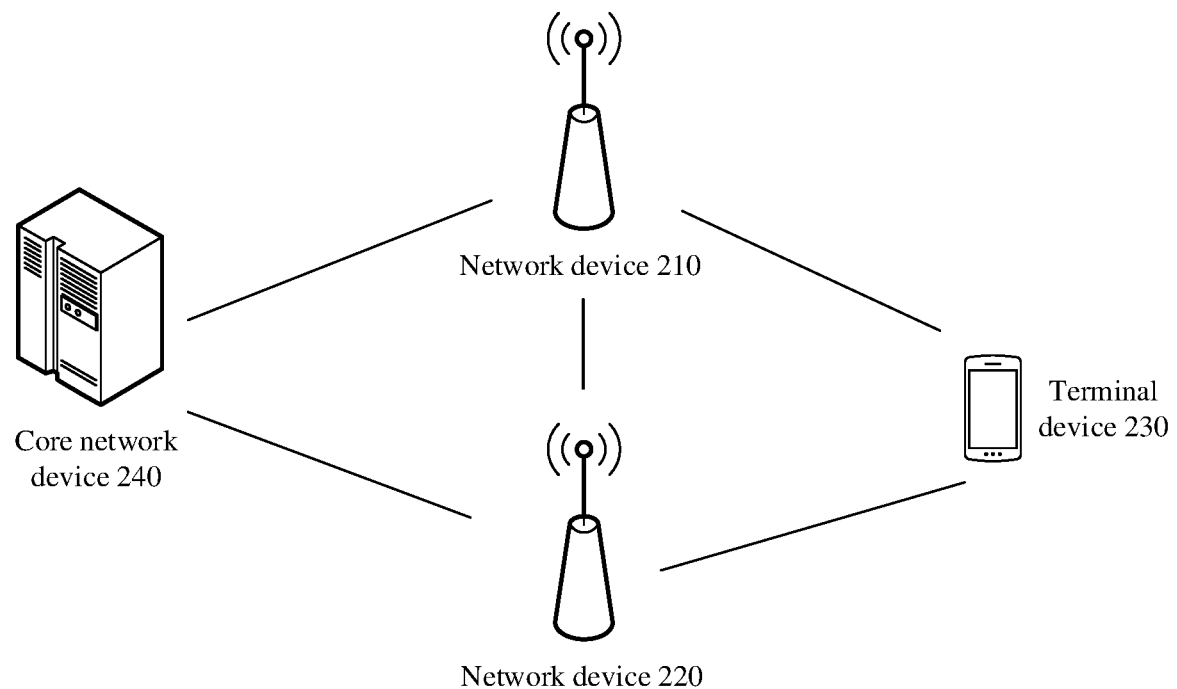
FIG. 2 is a schematic diagram of a communications system 200 applicable to this application.

FIG. 2 is a schematic diagram of a communications system 200 applicable to this application. As shown in FIG. 2, the communications system 200 may include at least two network devices, for example, a network device 210 and a network device 220, and the communications system 200 may further include at least one terminal device, for example, a terminal device 230. In addition, the communications system 200 may further include at least one core network device, for example, a core network device 240. It should be understood that FIG. 2 is merely a schematic diagram, and the communications system may further include another network device. In addition, quantities of network devices and terminal devices included in the mobile communications system are not limited in the embodiments of this application.

It should be understood that the network device (for example, the network device 210 and the network device 220 shown in FIG. 2) may also be referred to as a radio access network (radio access network, RAN) device, and is a device that connects a terminal device to a wireless network. The network device may be an evolved NodeB eNB or eNodeB in LTE, or may be a relay station or an access point, or may be a base station (an ng-eNB or a gNB) in a 5G network, for example, a transmission reception point (transmission reception point, TRP) and a controller. This is not specifically limited in this application.

In FIG. 2, the terminal device 230 may be connected to the network device 210 and the network device 220 through an air interface, the network device 210 and the network device 220 may be connected in a wired or wireless manner, and the network device 210 and the network device 220 may be connected to the core network device 240 in a wired or wireless manner. The core network device 240 may be a 4G core network device, or may be a 5G core network device. The network device 210 may be an LTE base station or an NR base station, and the network device 220 may be an LTE base station or an NR base station. The terminal device 230 may communicate with the network device 210 and the network device 220 by using a dual connectivity (DC) technology.

It should be understood that, according to the DC technology, two different network devices (for example, the network device 210 and the network device 220) can simultaneously provide a data transmission service for the terminal device 230. One network device may be referred to as a master base station or a master node (master node, MN), and the other network device is referred to as a secondary base station or a secondary node (secondary node, SN). It should be understood that the master base station and the secondary base station may be base stations of a same standard, or may be base stations of different standards. For example, the master base station is a master gNB (MgNB) of an NR standard, and the secondary base station is a secondary gNB (SgNB) of the NR standard. For another example, the master base station may be a master eNodeB (master eNB, MeNB) of an LTE standard, and the secondary base station may be a secondary eNodeB (SeNB) of the LTE standard. For another example, the master base station is a master gNB MgNB of an NR standard, and the secondary base station is a secondary eNodeB SeNB of an LTE standard. For another example, the master base station is a master eNodeB MeNB of an LTE standard, and the secondary base station is a secondary gNB SgNB of an NR standard. Therefore, there are a plurality of DC combinations. The following separately describes several possible DC combinations by using examples with reference to FIG. 3 to FIG. 6.

Figure 3:
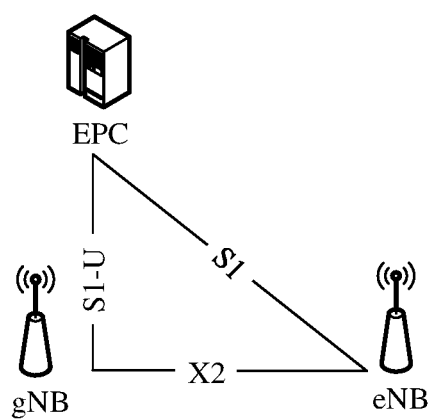
FIG. 3 is a schematic diagram of a DC architecture applicable to this application.

(1) When the core network device 240 is a packet core network (evolved packet core, EPC), an LTE base station serves as an MN, and an NR base station serves as an SN. The DC may also be referred to as an EN-DC (E-UTRA NR DC). Refer to FIG. 3. In this case, the LTE base station may be connected to the NR base station through an X2 interface. At least a control plane connection is included, and a user plane connection may be further included. The LTE base station may be connected to the EPC through an S1 interface. At least a control plane connection is included, and a user plane connection may be further included. The NR base station may be connected to the EPC through an S1-U interface, that is, only a user plane connection may be included. In this case, the LTE base station may provide an air interface resource for the terminal device 230 by using at least one LTE cell. In this case, the at least one LTE cell is referred to as a master cell group (MCG). Correspondingly, the NR base station may also provide an air interface resource for the terminal device 230 by using at least one NR cell. In this case, the at least one NR cell is referred to as a secondary cell group (secondary cell group, SCG).

Figure 4:
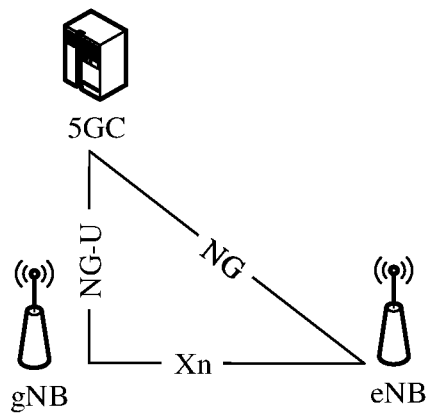
FIG. 4 is another schematic diagram of a DC architecture applicable to this application.

(2) When the core network device 240 is a 5G core network (5G core, 5GC), an LTE base station serves as an MN, and an NR base station serves as an SN. The DC may alternatively be referred to as an NGEN-DC (NG-RAN E-UTRA-NR dual connectivity). Refer to FIG. 4. In this case, the LTE base station may be connected to the NR base station through an Xn interface. At least a control plane connection is included, and a user plane connection may be further included. The LTE base station may be connected to the 5GC through an NG interface. At least a control plane connection is included, and a user plane connection may be further included. The NR base station may be connected to the 5GC through an NG-U interface, that is, only a user plane connection may be included. In this case, the LTE base station may provide an air interface resource for the terminal device 230 by using at least one LTE cell. In this case, the at least one LTE cell is referred to as an MCG. Correspondingly, the NR base station may also provide an air interface resource for the terminal device 230 by using at least one NR cell. In this case, the at least one NR cell is referred to as an SCG.

Figure 5:
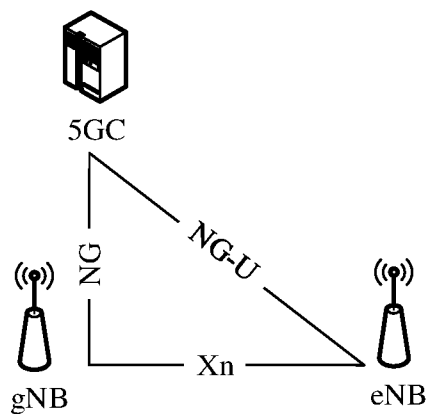
FIG. 5 is another schematic diagram of a DC architecture applicable to this application.

(3) When the core network device 240 is a 5GC, an NR base station serves as an MN, and an LTE base station serves as an SN. The DC may alternatively be referred to as a NE-DC (NR-E-UTRA dual connectivity). Refer to FIG. 5. In this case, the NR base station may be connected to the LTE base station through an Xn interface. At least a control plane connection is included, and a user plane connection may be further included. The NR base station may be connected to the 5GC through an NG interface. At least a control plane connection is included, and a user plane connection may be further included. The LTE base station is connected to the 5GC through an NG-U interface, that is, only a user plane connection may be included. In this case, the NR base station may provide an air interface resource for the terminal device 230 by using at least one NR cell. In this case, the at least one NR cell is referred to as an MCG. Correspondingly, the LTE base station may also provide an air interface resource for the terminal device 230 by using at least one LTE cell. In this case, the at least one LTE cell is referred to as an SCG.

It should be understood that an NG eNB is an LTE eNB that can be connected to the 5GC. NG LTE may also be referred to as eLTE. This is not specifically limited in this embodiment of this application.

Figure 6:
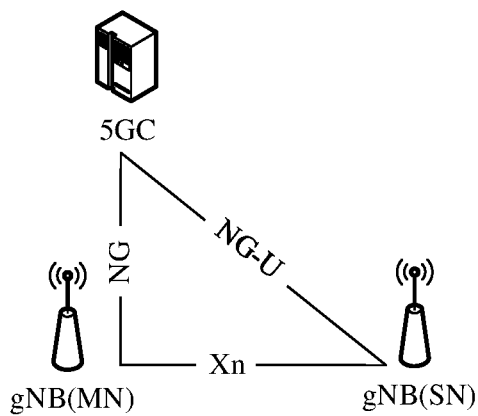
FIG. 6 is another schematic diagram of a DC architecture applicable to this application.

(4) When the core network device 240 is a 5GC, both an MN and an SN are NR base stations. The DC may alternatively be referred to as an NR-NR DC. Refer to FIG. 6. Both the master base station and the secondary base station are NR base stations, and the NR master base station may be connected to the NR secondary base station through an Xn interface. At least a control plane connection is included, and a user plane connection may be further included. The NR master base station is connected to the 5GC through an NG interface. At least a control plane connection is included, and a user plane connection may be further included. The NR secondary base station is connected to the 5GC through an NG-U interface, that is, only a user plane connection may be included. In this case, the NR master base station may provide an air interface resource for the terminal device 230 by using at least one NR cell. In this case, the at least one NR cell is referred to as an MCG. Correspondingly, the NR secondary base station may also provide an air interface resource for the terminal device 230 by using at least one NR cell. In this case, the at least one NR cell is referred to as an SCG.

It should be noted that the MCG includes one master cell and one or more optional secondary cells, and one SCG may include one primary secondary cell and one or more optional secondary cells.

It should be understood that in FIG. 3 to FIG. 6, an example in which the LTE base station is an eNB and the NR base station is a gNB is used for description. However, this shall not constitute any limitation on this application. It should be further understood that the foregoing several DC combinations are merely used as examples for description, and the embodiments of this application should not be limited to the foregoing several DC combinations.

It should be further noted that, in the network architecture diagrams shown in FIG. 1 and FIG. 2, a function of the terminal device may be implemented by using a hardware component inside the terminal device, and the hardware component may be a processor and/or a programmable chip inside the terminal device. Optionally, the chip may be implemented by an application-specific integrated circuit (ASIC) or a programmable logic device (PLD). The PLD may be any one of a complex programmable logic device (CPLD), a field programmable gate array (FPGA), generic array logic (generic array logic, GAL), and a system on a chip (SOC), or any combination thereof.

It should be further understood that in the embodiments of this application, "a plurality of" means two or more. In view of this, in the embodiments of this application, "a plurality of" may also be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B", "include A and C", "include B and C", or "include A, B, and C". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless specified otherwise. The terms "system" and "network" may be used interchangeably in the embodiments of this application. Unless otherwise specified, ordinal terms such as "first" and "second" mentioned in the embodiments of this application are used to distinguish a plurality of objects, but are not used to limit a sequence, a time sequence, a priority, or a level of importance among the plurality of objects.

In a process in which a terminal device communicates with a base station, the terminal device records visited cell information. After obtaining the visited cell information of the terminal device, the base station may optimize movement of the terminal device based on the visited cell information of the terminal device, or may further deliver a measurement configuration based on the visited cell information of the terminal device in a handover process.

In a DC scenario, in addition to a master base station that may trigger the terminal device to perform handover, a secondary base station may also trigger the terminal device to perform handover. For example, the secondary base station may trigger the terminal device to perform handover between a plurality of secondary base stations, or may trigger the terminal device to perform handover between cells of the secondary base station.

Figure 7:
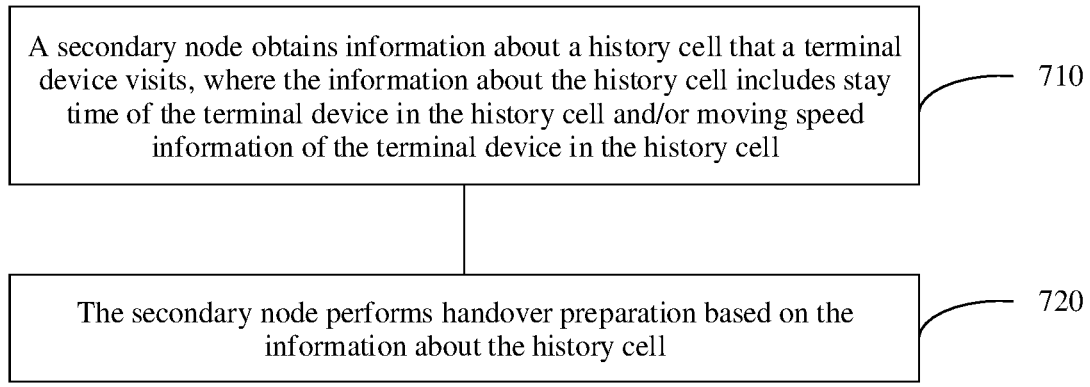
FIG. 7 is a schematic flowchart of a history information recording method according to an embodiment of this application.

According to a history information recording method provided in the embodiments of this application, a secondary base station may configure some related measurement parameters based on a speed at which a terminal device visits a history cell and stay time of the terminal device in the history cell, to indicate the secondary base station to trigger the terminal device to perform handover preparation. With reference to FIG. 7, the following describes in detail the history information recording method provided in the embodiments of this application.

FIG. 7 is a schematic flowchart of a history information recording method according to an embodiment of this application. As shown in FIG. 7, the method may include step 710 and step 720. The following describes in detail step 710 and step 720.

Step 710: A current secondary node obtains information about a history cell that a terminal device visits.

The information about the history cell may be the information about the history cell that the terminal device visits. Herein, the "visit" may be understood as that the terminal device accesses the cell, or the terminal device camps on the cell, or the cell provides a communication or connection service for the terminal device. Optionally, the information about the history cell includes stay time of the terminal device in the history cell and/or moving speed information of the terminal device in the history cell.

The current secondary node may be understood as that the secondary node provides a communication or connection service for the terminal device, or the terminal device accesses the secondary node. The current master node may be understood as that the master node provides a communication or connection service for the terminal device, or the terminal device accesses the master node.

There are a plurality of specific implementations in which the current secondary node obtains the information about the history cell that the terminal device visits. The information about the history cell may be received from the terminal device. Alternatively, the information about the history cell may be received from the master node MN, where the information about the history cell may be recorded by the master node MN, or may be recorded by the terminal device and reported to the master node MN, or may be recorded by the terminal device and reported to the secondary node, or may be recorded by a network side obtained from another node when the master node MN is used as a target base station in a handover scenario, or may be reported by a terminal device obtained from another node when the master node MN is used as a target base station in a handover scenario. The following provides detailed descriptions with reference to specific embodiments. Details are not described herein again.

Speed information of the terminal device in the history cell that the terminal device visits may be reported by the terminal device, or may be determined by the master node MN based on the stay time of the terminal device in the history cell that the terminal device visits and a coverage area of a frequency cell corresponding to the master node MN. This is not specifically limited in this application.

It should be noted that, the speed information of the terminal device in the history cell that the terminal device visits may be a specific speed value, or may be movement status information. For example, the movement status information may include but is not limited to a high-speed movement state, a medium-speed movement state, and a low-speed movement state.

In this embodiment of this application, the stay time of the terminal device in the history cell that the terminal device visits may be stay duration of the terminal device in a corresponding cell, or may be a time point at which the terminal device enters the cell, for example, absolute time in a format of YY-MM-DD.

It should be understood that the stay time of the terminal device in the history cell that the terminal device visits may be reported by the terminal device, or may be stay time of the terminal device in one history cell that is determined by the master node MN based on stay time of the terminal device in history cells that the terminal device visits and a quantity of the history cells that the terminal device visits.

In this embodiment of this application, the information about the history cell that the terminal device visits includes one or more of the following cases: information about a cell that the terminal device visits in an idle state (RRC_idle), information about a cell that the terminal device visits in an inactive state (RRC_inactive), and information about a cell that the terminal device visits in a connected state (RRC_connected). This is not limited in this application.

Step 720: The secondary node performs handover preparation based on the information about the history cell.

In this embodiment of this application, the handover preparation may include but is not limited to: The secondary node SN delivers a measurement configuration to the terminal device, and the secondary node SN determines whether to perform handover.

For example, the secondary node SN delivers the measurement configuration to the terminal device based on the information about the history cell that the terminal device visits. The secondary node SN may determine time to trigger in the measurement configuration based on the information about the history cell that the terminal device visits. For example, when a speed at which the terminal device visits the history cell is relatively high (for example, greater than a speed threshold), the time to trigger in the measurement configuration may be set to be shorter (for example, less than a time threshold), so that the terminal device may be triggered to report a measurement result within relatively short time. For another example, when a speed at which the terminal device visits the history cell is relatively low (for example, less than a speed threshold), the time to trigger in the measurement configuration may be set to be longer (for example, greater than a time threshold), to ensure accuracy of a measurement result of the terminal device or avoid premature handover of the terminal device.

It is used as an example in which the secondary node SN determines, based on the information about the history cell that the terminal device visits, whether to perform handover. The secondary node SN may determine, based on the stay time of the terminal device in the history cell that the terminal device visits and/or the speed information of the terminal device in the history cell that the terminal device visits, whether to hand over to a target cell. For example, when stay time of the terminal device in a cell is relatively short (for example, less than a time threshold) and/or a speed at which the terminal device visits the cell is relatively low (for example, less than a speed threshold), the secondary node SN may determine not to hand over to the cell. For example, when stay time of the secondary node SN in a cell is relatively long (for example, greater than a time threshold) and/or a speed at which the terminal device visits the cell is relatively high (for example, greater than a speed threshold), the secondary node SN may consider handing over to the cell. For another example, when the secondary node SN determines, based on the stay time of the terminal device in the history cell that the terminal device visits and/or the speed information of the terminal device in the history cell that the terminal device visits, that a moving speed of the terminal device is relatively low (for example, less than a speed threshold), the secondary node SN may determine that the terminal device can be handed over to a cell whose coverage area is relatively small (for example, less than a coverage area threshold). If the secondary node SN determines that the moving speed of the terminal device is relatively high (for example, greater than a speed threshold), the secondary node SN may determine that the terminal device does not need to be handed over to a cell whose coverage area is relatively small (for example, less than a coverage area threshold).

It should be understood that in the embodiments of this application, "greater than" may be understood as that one numerical value is greater than another numerical value. In other words, for any two numerical values (a first numerical value and a second numerical value), points corresponding to the two numerical values may be found on a same numerical axis. If the first numerical value is located on the right of the second numerical value, the first numerical value is greater than the second numerical value. "less than" is understood as that one numerical value is smaller than another numerical value. In other words, for any two numerical values (a first numerical value and a second numerical value), points corresponding to the two numerical values may be found on a same numerical axis. If the first numerical value is located on the left of the second numerical value, the first numerical value is less than the second numerical value.

The following provides detailed descriptions with reference to FIG. 8 to FIG. 11 by using an example in which the information about the history cell that the terminal device visits is visited cell information of the terminal device in RRC_idle and/or visited primary cell information of the terminal device in a connected state (RRC_connected). The following examples are merely intended to help a person skilled in the art understand the embodiments of this application, instead of limiting this embodiment of this application to a specific numerical value or a specific scenario shown in the examples. It is clearly that a person skilled in the art can make various equivalent modifications or changes based on the examples, and such modifications and changes also fall within the scope of the embodiments of this application.

Figure 8:
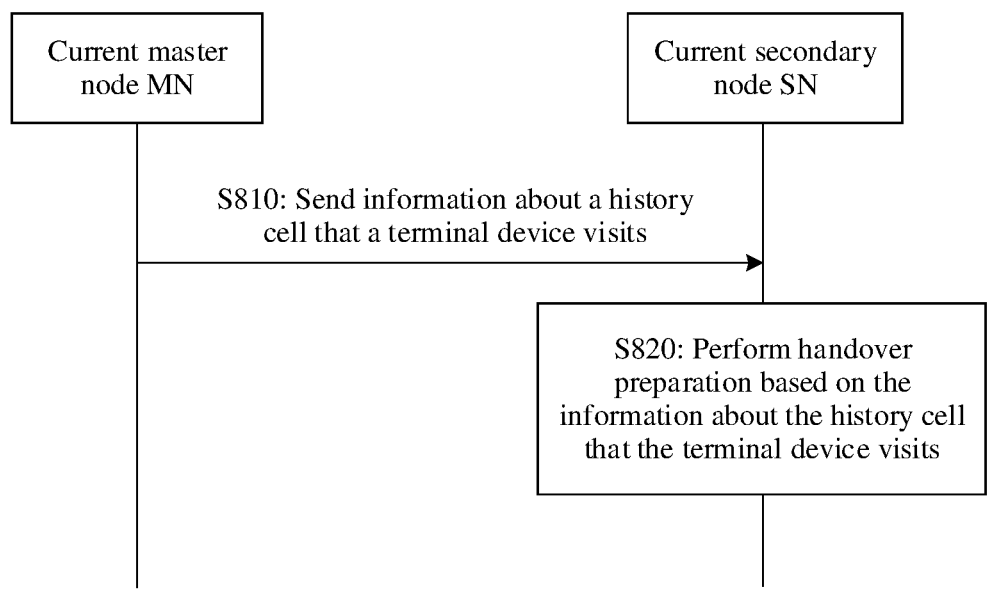
FIG. 8 is a schematic flowchart of another history information recording method according to an embodiment of this application.

FIG. 8 is a schematic flowchart of another history information recording method according to an embodiment of this application. As shown in the figure, the method includes step 810 and step 820. The following separately describes step 810 and step 820 in detail.

Step 810: A current master node MN sends information about a history cell that a terminal device visits to a current secondary node SN.

In this embodiment of this application, the information about the history cell that the terminal device visits, obtained by the current secondary node SN, may include but is not limited to one or more of the following: a physical cell identity (PCI) of the history cell that the terminal device visits, a global cell identity (GCI) of the history cell that the terminal device visits, a frequency of the history cell that the terminal device visits, stay time of the terminal device in the history cell that the terminal device visits, speed information of the terminal device in the history cell that the terminal device visits, a cell type of the history cell that the terminal device visits (for example, a cell size is one of very small, small, medium, and large), an RRC state (for example, an idle state (RRC_idle), a connected state (RRC_connected), or an inactive state (RRC_inactive)) in which the terminal device moves in the history cell that the terminal device visits, and duration of stay in the RRC state, and beam (beam) information of the terminal device in the history cell that the terminal device visits, for example, serving beam information of the terminal device or best beam information of the terminal device. Optionally, the beam information herein may be a synchronization signal block (synchronization signal block, SSB) or a channel state information reference signal (channel state information reference signal, CSI-RS).

An example in which the terminal device is UE is used below to list a possible information element structure of the information about the history cell.

cell of the terminal device in RRC_connected or a history camping cell of the terminal device in RRC_idle or RRC_inactive. The serving cell or the camping cell may be a cell of the master node MN, or may be another cell (for example, the terminal device does not establish dual connectivity, the terminal device is located in only one cell of one base station, and an RRC state of the terminal device may be a connected state, an inactive state, or an idle state).

In an example, when a cell changes, for example, the terminal device is handed over from a primary cell in RRC_connected, or a camping cell in RRC_idle, or a camping cell in RRC_inactive to another intra-RAT cell of the same access technology (RAT), or another intra-RAT cell of different RATs (for example, a cell connected to an LTE base station in 5GC and connected to an NR base station in the 5GC), or another inter-RAT cell, or when entering out of service (when entering out of service), the terminal device adds an entity to stored mobility history information, where

```
UE history information//UE history information
{
  visited cell information list//visited cell information list, where an element in the
visited cell information list is visited cell information (visited cell information), that is, the
visited cell information list includes one or more pieces of visited cell information
}
visited cell information//visited cell information
{
   visited cell ID//visited cell identity (identification, ID)
   {
       GCI//global cell identity
       PCI-arfcn//physical cell identity and frequency information
       {
         PCI//physical cell identity
         carrier Freq//carrier frequency
       }
   }
   time spent//time spent
   start time//start time
}
```

Optionally, in some embodiments, the information about the history cell is recorded by the terminal device and reported to the current master node MN. For example, referring to FIG. 9, step 910 and step 920 are further included before step 810 in FIG. 8.

Step 910: The terminal device records the information about the history cell that the terminal device visits.

In a current 5G system, a radio resource control (RRC) state of a terminal device may include an idle state (RRC_idle), a connected state (RRC_connected), and an inactive state (RRC_inactive). RRC_inactive (also referred to as an "RRC non-active state", or an "RRC inactive state", or a "non-active state") is a radio resource control RRC state newly introduced in new radio (NR). RRC_inactive is the same as the idle state. In RRC_inactive, the terminal device disconnects an RRC connection to the network, to achieve a power saving effect same as that in the idle state. Different from that in the idle state, in RRC_inactive, the terminal device and an access network device store context of the terminal device. When the terminal device returns to the RRC connected state, the previously saved context of the terminal device can be reused, so that a connection is quickly restored.

In this embodiment of this application, when recording the information about the history cell that the terminal device visits, the terminal device may record visited cell information in RRC_idle, or may record visited cell information in RRC_inactive, or may record visited cell information in RRC_connected. The cell may be a history serving the entity is configured to record the information about the history cell (optionally, a quantity of corresponding entities is limited, and if the quantity exceeds the maximum quantity, the oldest entity is deleted first). The terminal device may record related content in the following manners.

If a global cell identity GCI of a previous serving cell (for example, it may be a previous primary cell) is available (that is, may be obtained), the terminal device may add the GCI to a visited cell identity (visited cell ID) of the entity, or add a physical cell identity PCI and a frequency of the serving cell to a visited cell ID of the entity. The terminal device may further record, in the entity, duration of stay and speed information in a previous serving cell.

The following describes in detail a specific implementation in which the terminal device determines the speed information.

The terminal device may record and report, at a moment, a speed at which the terminal device visits a cell and/or movement status information in the cell, or may further record and report an average speed at which the terminal device visits one or more cells and/or movement status information in the one or more cells.

An example in which the terminal device records movement status information in one or more cells is used. The terminal device may determine the movement status information within a period of time based on a comparison between a quantity of cell reselection times of the terminal device and a specific threshold. The medium-speed movement state means that a quantity of cell reselection times of the terminal device within a period of time is within a specific range (for example, greater than or equal to a value A but less than or equal to another value B, or greater than one value A but not greater than one value B). The high-speed movement state means that a quantity of cell reselection times of the terminal device within a period of time exceeds a specific value (for example, exceeds the value B). The normal-speed movement state means that a quantity of cell reselection times of the terminal device within a period of time is less than a specific value (for example, less than A, or not greater than A). Optionally, when determining the movement status information, the terminal device does not consider continuous cell reselection (for example, after a cell is re-selected, the terminal device re-selects the cell again). For example, the terminal device reselects cell 2 from cell 1, and then reselects cell 1 again. For example, only one cell reselection is performed.

Optionally, the time range and a threshold of the quantity of cell reselection times may be sent by a network side to the terminal device by using a broadcast message. Optionally, the foregoing movement status information may be movement status information of the terminal device just before the terminal device enters the RRC_connected state. It should be understood that the foregoing movement status information may be movement status information recently determined before the terminal device enters the RRC_connected state. After the terminal device enters the RRC_connected state, the terminal device reports the movement status information to the network side.

In another example, when the terminal device enters a current RAT from another RAT and is in an RRC_Connect or RRC_idle state in the current RAT, or the terminal device enters a current RAT from an out-of-service area and is in an RRC_Connect or RRC_idle state in the current RAT, the terminal device adds an entity to a stored movement history, where the entity is configured to record history cell information (a quantity of corresponding entities is limited, and if the quantity exceeds the maximum quantity, the oldest entity is deleted first). Time spent outside the current RAT is recorded in this entity.

Step 920: The terminal device sends the recorded information about the history cell to the current master node MN.

When the terminal device re-accesses a network in RRC_inactive or RRC_idle, the terminal device may send the recorded information about the history cell to the current master node MN when accessing the network.

Specifically optionally, the terminal device indicates a network side (for example, the master node MN) that the terminal device stores mobility history information. As an example instead of a limitation, the terminal device may add a piece of indication information to an RRC connection setup complete message or an RRC connection resume complete message, to indicate that the terminal device has the information about the history cell that the terminal device visits. Subsequently, the master node MN may request the terminal device to report the recorded information about the history cell. For example, the master node MN may add one piece of indication information to a UE information request message, and the indication information is used to request the terminal device to send the recorded information about the history cell. After receiving the request, the terminal device reports the mobility history information. For example, the information about the history cell that is recorded by the terminal device may be carried in a UE information response message.

It should be noted that when the terminal device is handed over between different cells or base stations, a source cell or a source base station sends, to a target cell or a target base station, the information about the history cell that is reported by the terminal device (for example, the source cell or the source base station may add, to a handover request message sent to the target cell or the target base station, the information about the history cell that is reported by the terminal device). In the handover process, the current master node serves as the target base station. In this case, the current master node may receive the information about the history cell from the source base station.

Figure 10:
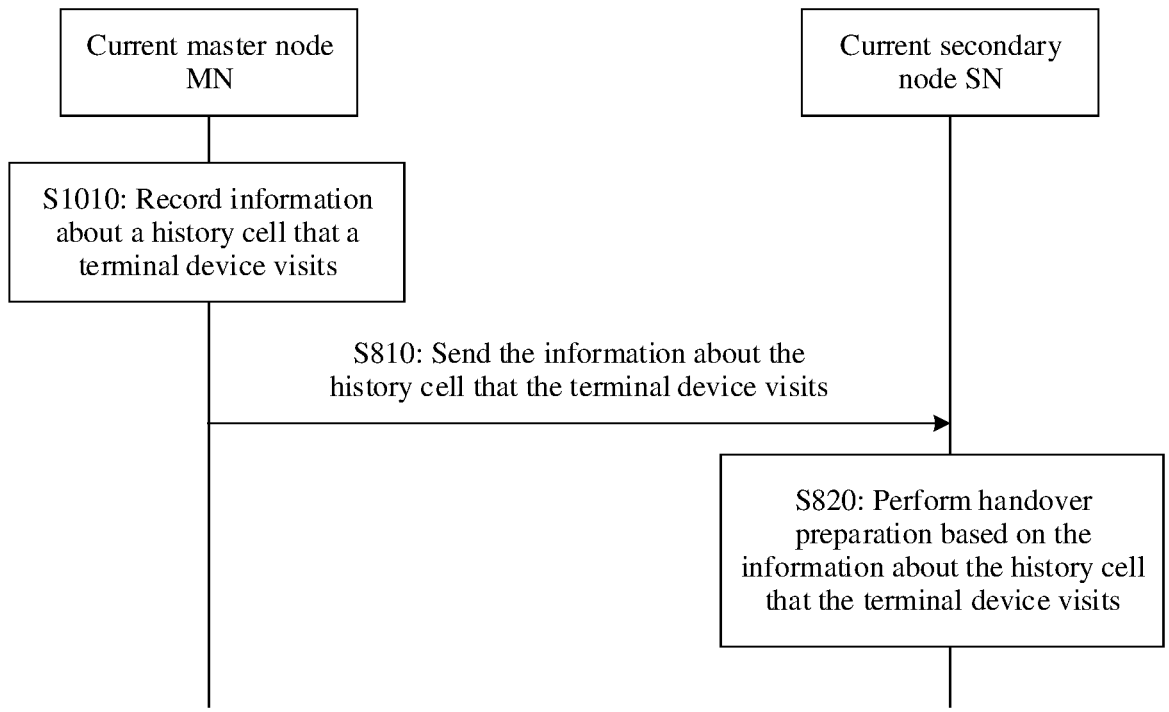
FIG. 10 is a schematic flowchart of another history information recording method according to an embodiment of this application.

Optionally, in some other embodiments, the information about the history cell is recorded by the current master node MN or/and another node. Referring to FIG. 10, step 1010 is further included before step 810.

Step 1010: The current master node MN or/and the another node record the information about the history cell that the terminal device visits.

The current master node MN or/and the another node may record information about a visited history cell of the node that the terminal device visits in RRC_connected. The information about the history cell that the terminal device visits, which can be recorded by the current master node MN or/and the another node, is the same as the information about the history cell that is recorded by the terminal device. For details, refer to the description about the information about the history cell that is recorded by the terminal device. Details are not described herein again. The another node sends its recorded information about the history cell that the terminal device visits to the current master node MN. For example, during handover between different cells or base stations, a source cell or a source base station sends, to a target cell or a target base station, the information about the history cell that is reported by the terminal device (for example, the source cell or the source base station may add, to a handover request message sent to the target cell or the target base station, the information about the history cell that is reported by the terminal device).

The following describes in detail a specific implementation in which the current master node MN or/and the another node determines the moving speed information in the information about the history cell.

In another example, the current master node MN or/and the another node determines an average speed at which the terminal device visits one or more cells and/or movement status information in the one or more cells. The current master node MN or/and the another node may determine the average speed at which the terminal device visits the one or more cells and/or the movement status information in the one or more cells based on a quantity of cell reselection times of the terminal device within a specific period of time and duration of stay in each cell that are reported by the terminal device, and a coverage area of a frequency cell corresponding to the current master node MN or/and the another node. For example, the current master node MN or/and the another node determines speed information of the terminal device in three cells that the terminal device visits based on time at which the terminal device visits the three history cells and coverage areas of the three cells.

In another example, the current master node MN determines an average speed at which the terminal device visits one or more cells and/or movement status information in the one or more cells based on duration of stay in the one or more cells that is recorded by the master node and/or the another node, and a coverage area of a frequency cell corresponding to the current master node MN or/and the another node. For example, the current master node MN determines speed information of the terminal device in three cells that the terminal device visits based on time at which the terminal device visits the three history cells, and coverage areas of the three cells.

Still referring to FIG. 8, in step 820, the current secondary node SN performs handover preparation based on the information about the history cell that the terminal device visits.

Step 820 corresponds to step 720. For details, refer to the description in step 720, and details are not described herein again.

Figure 11:
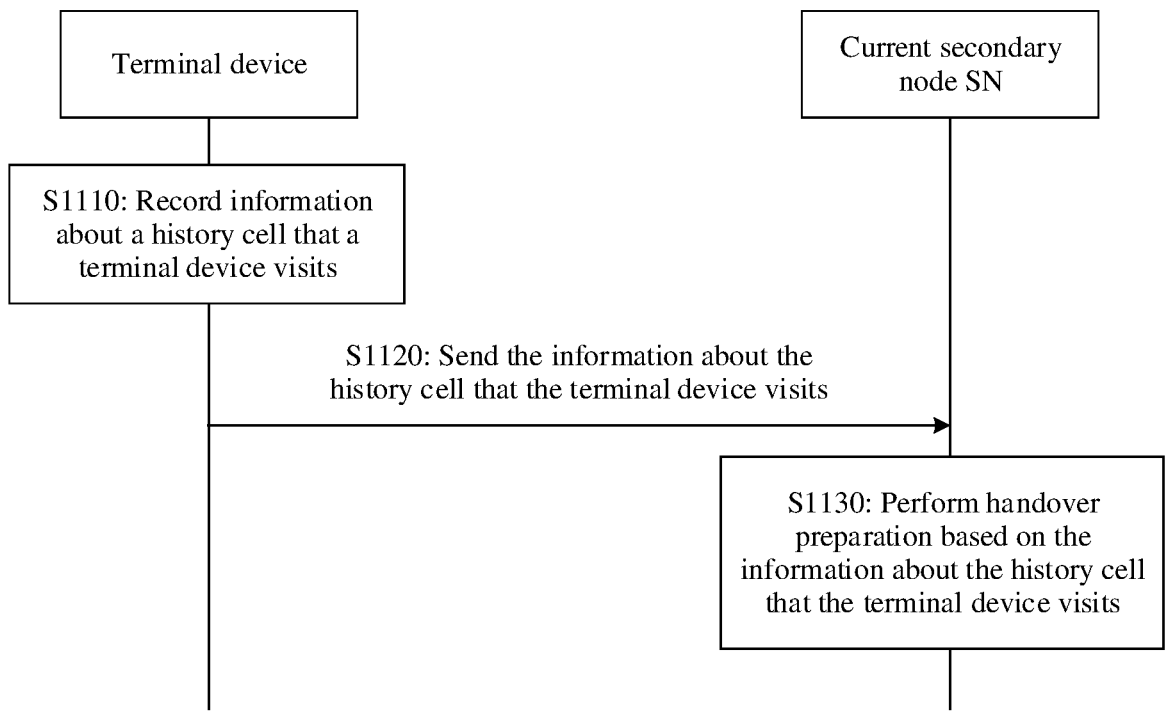
FIG. 11 is a schematic flowchart of another history information recording method according to an embodiment of this application.

Optionally, in some embodiments, the terminal device may alternatively send the recorded information about the history cell directly to the current secondary node SN. Referring to FIG. 11, the method includes step 1110 to step 1130. The following separately describes step 1110 to step 1130 in detail.

Step 1110: The terminal device records the information about the history cell that the terminal device visits.

Figure 9:
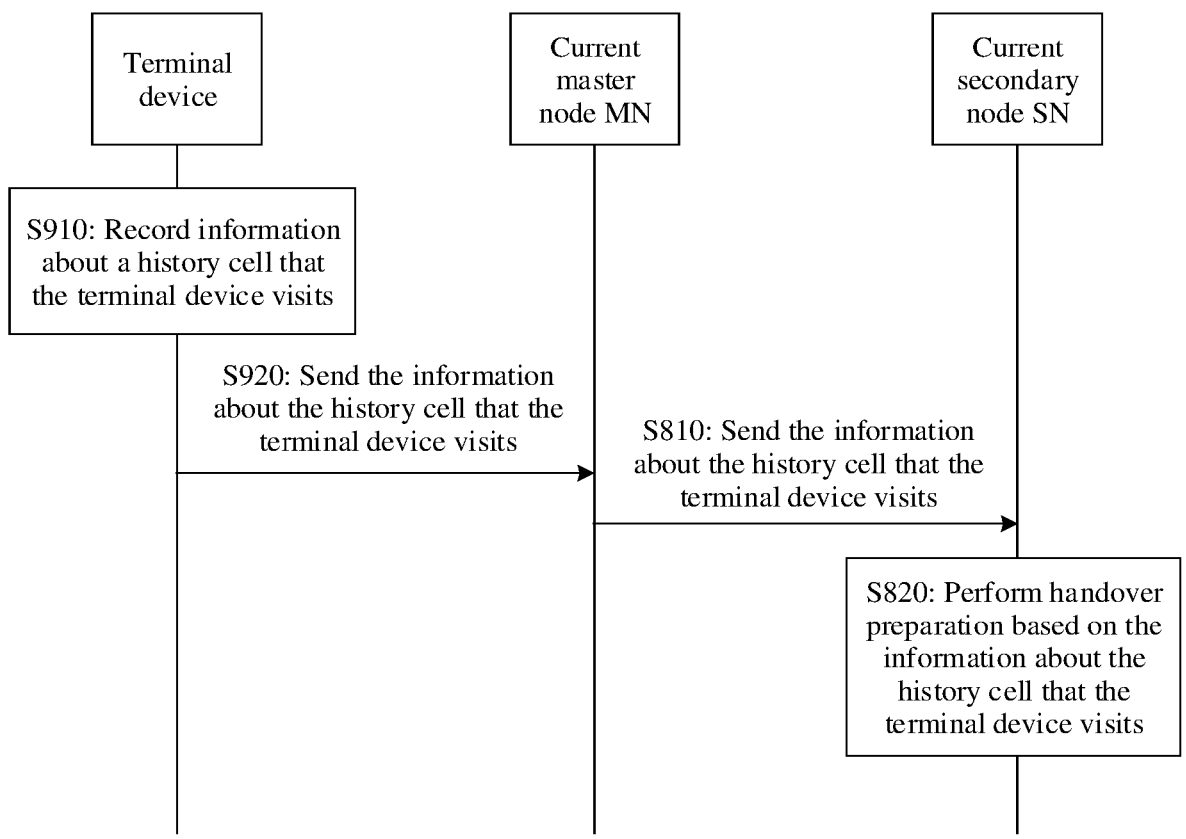
FIG. 9 is a schematic flowchart of another history information recording method according to an embodiment of this application.

The step corresponds to step 910 in FIG. 9. For details, refer to the description in step 910, and details are not described herein again.

Step 1120: The terminal device sends the information about the history cell that the terminal device visits to the current secondary node SN.

Optionally, in this step, the terminal device may send the information about the history cell that the terminal device visits directly to the current secondary node SN, for example, by using a signaling radio bearer 3 (SRB3). Alternatively, the terminal device may first send the information about the history cell that the terminal device visits to the current master node MN, and then the current master node MN sends the information to the current secondary node SN. For example, after the terminal device adds the information about the history cell to an RRC message sent to the current master node MN, the current master node sends the information to the secondary node. For another example, the terminal device nests an RRC message for the current secondary node in an RRC message for the current master node MN, and the RRC message for the current secondary node carries the information about the history cell. Then, the current master node sends the RRC message for the current secondary node to the current secondary node.

Step 1130: The current secondary node SN performs handover preparation based on the information about the history cell that the terminal device visits.

The step corresponds to step 720 in FIG. 7. For details, refer to the description in step 720, and details are not described herein again.

Figure 12:
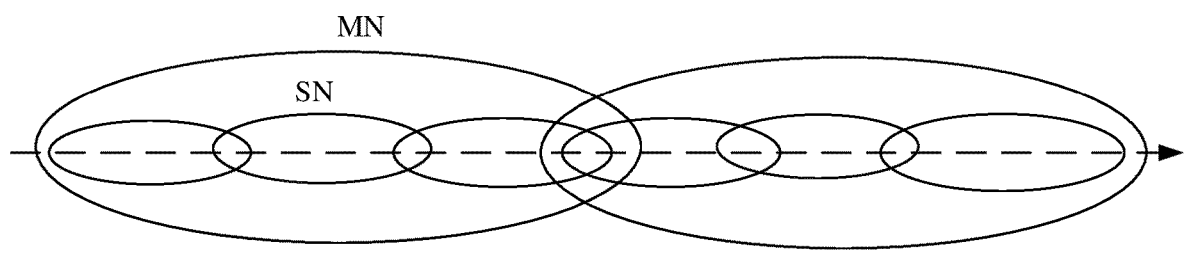
FIG. 12 is a schematic diagram of possible MN handover and SN handover according to an embodiment of this application.
Figure 13:
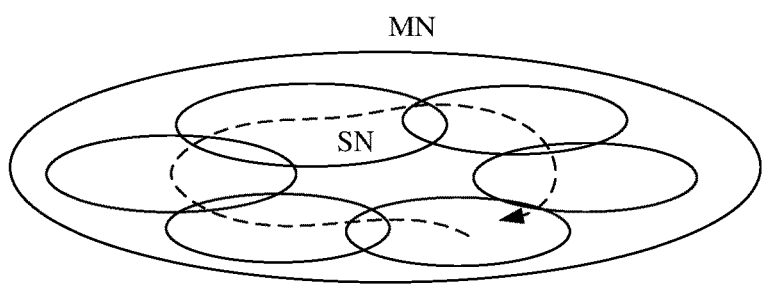
FIG. 13 is a schematic diagram of another possible MN handover and SN handover according to an embodiment of this application.

The foregoing describes that the secondary node SN performs handover preparation based on information about a cell that is of the master node MN and that the terminal device visits. However, a quantity of cells in which the terminal device moves and that are of the master node MN may be different from a quantity of cells in which the terminal device moves and that are of the secondary node SN. In addition, when a cell of the secondary node SN changes, a cell of the master node MN may not change. Therefore, it may not be particularly accurate that the secondary node SN uses, as a reference for handover preparation, stay time of the terminal device in a visited cell of the master node MN and/or moving speed information of the terminal device in the cell of the master node MN. For example, referring to FIG. 12 and FIG. 13, in FIG. 12, a quantity of cells in which the terminal device moves of the master node MN is 2, and a quantity of cells in which the terminal device moves of the secondary node SN is 6. If the secondary node SN performs handover preparation of the secondary node SN based on stay time of the terminal device in two visited cells of the master node MN and/or moving speed information of the terminal device in the cells of the master node MN, a result is inaccurate. For another example, in FIG. 13, a plurality of cells of the secondary node SN change, but a cell of the master node MN does not change. Therefore, if the secondary node SN performs handover preparation of the secondary node SN based on stay time of the terminal device in two visited cells of the master node MN and/or moving speed information of the terminal device in the cells of the master node MN, a result is inaccurate. In this embodiment of this application, the secondary node SN may perform handover preparation based on mobility history information of the terminal device in a cell of the secondary node SN.

Optionally, in some embodiments, the terminal device may record information about a history cell of the master node MN and information about a history cell of the secondary node SN that the terminal device visits in RRC_connected, and send the recorded information about the history cells to the master node MN. Then, the master node MN sends the information to the secondary node SN. The following provides detailed descriptions with reference to FIG. 14.

Figure 14:
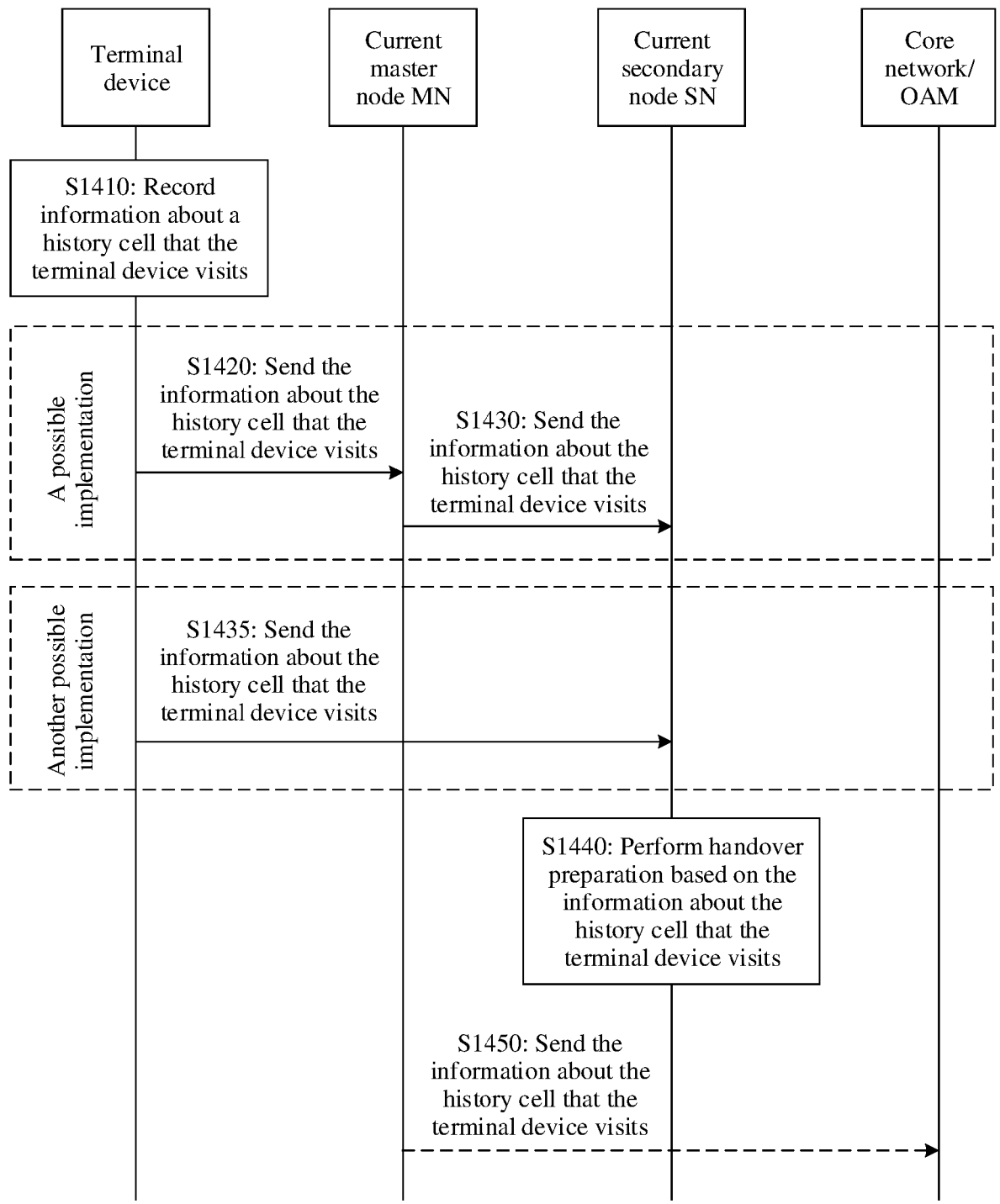
FIG. 14 is a schematic flowchart of another history information recording method according to an embodiment of this application.

FIG. 14 is a schematic flowchart of another history information recording method according to an embodiment of this application. As shown in the figure, the method includes step 1410 to step 1440. The following separately describes step 1410 to step 1440 in detail.

Step 1410: The terminal device records information about a history cell that the terminal device visits, where the history cell includes a cell of one or more secondary nodes SNs.

The terminal device may record one or more of the following:

The terminal device records information about a history cell that the terminal device visits in RRC_idle.

The terminal device records information about a history cell that the terminal device visits in RRC_inactive.

The terminal device records the information about the history cell of the master node MN and the information about the history cell of the secondary node SN that the terminal device visits in RRC_connected.

It should be understood that, for the specific information about the history cell recorded by the terminal device, refer to the description of step 710 in FIG. 7. Details are not described herein again.

Optionally, in some embodiments, when the terminal device records the information about the history cell of the master node MN and the information about the history cell of the secondary node SN that the terminal device visits in RRC_connected, a primary secondary cell of the secondary node SN may also be associated with a primary cell of the master node MN. In other words, when the terminal device is handed over between a plurality of history cells of the secondary node SN, the terminal device is always connected to a same primary cell of the master node MN. For example, when the primary cell of the master node MN changes, the terminal device may re-record, in a new primary cell, a history cell in which the terminal device moves of the secondary node SN.

With reference to a specific example, the following describes in detail a specific implementation in which the terminal device records the information about the history cell of the master node MN and the information about the history cell of the secondary node SN that the terminal device visits in RRC_connected. It should be understood that the following examples are merely intended to help a person skilled in the art understand this embodiment of this application, instead of limiting this embodiment of this application to a specific numerical value or a specific scenario shown in the examples. It is clearly that a person skilled in the art can make various equivalent modifications or changes based on the examples, and such modifications and changes also fall within the scope of the embodiments of this application.

It should be noted that if the primary cell changes, the terminal device may re-record, in the new primary cell, a history cell in which the terminal device moves and that is of the secondary node SN. In this case, the terminal device adds an entity of a previous primary cell to stored movement history information. If a primary secondary cell changes, the terminal device adds an entity of a previous primary secondary cell to the stored movement history information.

In an example, when the primary secondary cell (PScell) changes or is released, or a secondary node is released, if the primary cell (PCell) of the current master node does not change and an entity of a recent movement history is of the current primary cell, the terminal device includes, in a movement history corresponding to the primary cell, the recorded information about the previous primary secondary cell.

It should be understood that the dual connectivity may be that two different nodes simultaneously provide a data transmission service for one terminal device. That is, in a dual connectivity scenario, one terminal device simultaneously maintains an RRC connection to two different nodes. In dual connectivity, a group in which a cell in which the terminal device first initiates a random access channel (RACH) is located is a master cell group (MCG). There may be a plurality of cells in the MCG, and one cell used to initiate initial access is referred to as a primary cell (PCell). As the name implies, the PCell is the most "primary" cell in the MCG. Similarly, there may also be a primary cell in a secondary cell group (SCG), that is, a PScell, which may also be simply understood as a cell in which initial access is initiated in the SCG.

It should be noted that, optionally, a quantity of corresponding primary secondary cells is limited. If the quantity exceeds the maximum quantity, the oldest primary secondary cell is first deleted.

If a global cell identity GCI of a previous primary secondary cell is available, the GCI is carried in a visited primary secondary cell identity (visited PSCell ID), or a physical cell identity PCI and a frequency of the cell are carried in the visited PSCell ID. The terminal device may further record, in the entity, stay duration of the terminal device in the previous primary secondary cell.

In another example, when a PScell cell changes or is released, or the secondary node is released, if the current primary cell does not change and an entity of a recent movement history does not record the current primary cell, the terminal device adds recorded information about the current primary cell to an entity of the stored movement history. It should be understood that, when the primary secondary cell changes or is released, or the secondary node is released, if the entity records the information about the current primary cell, information about a primary secondary cell before the primary secondary cell changes needs to be added to the information about the current primary cell. If the current entity does not record the information about the current primary cell, the information about the current primary cell needs to be added to the entity, and then information about a primary secondary cell before an associated primary secondary cell changes is added to the information about the current primary cell.

It should be noted that a quantity of corresponding primary cells is limited. If the quantity exceeds the maximum quantity, the oldest primary cell is deleted first.

If a global cell identity GCI of the primary cell is available, the GCI is carried in the visited cell ID of the entity, or a physical cell identity PCI and a frequency of the cell are carried in the visited cell ID of the entity.

If a global cell identity GCI of a previous primary secondary cell is available, the GCI is carried in the visited PSCell ID, or a physical cell identity PCI and a frequency of the cell are carried in the visited PSCell id. In addition, stay duration of the terminal device in the previous primary secondary cell is recorded.

An example in which the terminal device is UE is used below to list an information element structure of information about a history cell associated between a primary secondary cell of a secondary node SN and a primary cell of a master node MN.

```
UE history information//UE history information
{
    visited cell information list//visited cell information list, where an element in the
visited cell information list is visited cell information, that is, the visited cell information list
includes one or more pieces of visited cell information
}
visited cell information//visited cell information
{
    visited cell ID//visited history cell identity of the UE
    {
        GCI//global cell identity
        PCI-arfcn//physical cell identity and frequency information
        {
            PCI//physical cell identity
            carrier Freq//carrier frequency
        }
    }
    time spent//time spent
    start time//start time
    visited PSCell information list//visited primary secondary cell information list,
where an element in the visited primary secondary cell information list is visited history primary
secondary cell information (visited PSCell information), that is, the visited primary secondary
cell information list includes one or more pieces of visited PSCell information
}
```

```
visited PSCell information//visited history primary secondary cell information
{
    visited PSCell ID//visited history primary secondary cell identity
    {
        GCI//global cell identity
        PCI-arfcn//physical cell identity and frequency information
        {
            PCI//physical cell identity
            carrier Freq//carrier frequency
        }
    }
    time spent//time spent
    start time//start time
}
```

It should be noted that the foregoing information element structure does not require that the foregoing information elements appear simultaneously.

Optionally, the information element structure is used as an example. When the primary secondary cell changes or is released, or the secondary node is released, if a latest visited cell information in the current visited cell information list is information about the current primary cell (that is, a visited cell ID in the latest visited cell information is an identity of the current primary cell), information about a primary secondary cell before the primary secondary cell changes is added to a visited PScell Information list under the visited cell information corresponding to the current primary cell. If the latest visited cell information in the current visited cell information list is not information about the current primary cell, the information about the current primary cell is added to the visited cell information list (for example, one piece of visited cell information is added, including the information about the current primary cell), and then information about a primary secondary cell before an associated primary secondary cell changes is added to the information about the current primary cell (for example, primary secondary cell information visited PScell information before the primary secondary cell changes is added to the visited PScell Information list under the visited cell information of the current primary cell).

Optionally, in some embodiments, after the master node MN moves (for example, the primary cell of the master node MN changes), time spent of a primary secondary cell corresponding to a secondary node SN associated with the new master node MN needs to be re-recorded. That is, the time spent of the primary secondary cell corresponding to the secondary node SN is time spent of the primary secondary cell corresponding to a primary cell of the master node MN. For example, when the primary cell of the master node MN changes, the terminal device adds information about a previous primary cell to the visited cell information list, and then adds information about a current primary secondary cell to the visited PScell information list in the information about the previous primary cell. Specific content of the information about the primary cell and the information about the primary secondary cell is the same as that described above, where the time spent of the primary secondary cell is time spent of the primary secondary cell corresponding to a primary cell of the corresponding master node MN.

Optionally, in some embodiments, when the secondary node SN is deleted, indication information indicating that the secondary node SN is released needs to be recorded, and the indication information may be used to indicate that the terminal device does not continuously configure a primary secondary cell PSCell.

Specifically, the indication information may be carried in the visited cell information, or may be carried in visited PSCell information. The following separately lists information element structures of information about a history cell in the foregoing two different cases.

As an example, the indication information may be carried in the visited cell information, and an information element structure of information about a history cell is shown

```
UE history information//UE history information
{
    visited cell information list//visited cell information list, where an element in the
visited cell information list is visited cell information, that is, the visited cell information list
includes one or more pieces of visited cell information
}
visited cell information//visited cell information
{
    visited cell ID//visited cell identity
    {
        GCI//global cell identity
        PCI-arfcn//physical cell identity and frequency information
        {
            PCI//physical cell identity
            carrier Freq//carrier frequency
        }
    }
    time spent//time spent
    start time//start time
    visited PSCell information list//visited primary secondary cell information list,
where an element in the visited primary secondary cell information list is visited history primary
secondary cell information (visited PSCell information), that is, the visited primary secondary
cell information list includes one or more pieces of visited PSCell information
```

```
   indication information//indicating release of a primary secondary cell of a
secondary node SN or release of a secondary node SN
   }
   visited PSCell information//visited primary secondary cell information
   {
      visited PSCell ID//visited primary secondary cell identity
      {
         GCI//global cell identity
         PCI-arfcn//physical cell identity and frequency information
         {
            PCI//physical cell identity
            carrier Freq//carrier frequency
         }
      }
      time spent//time spent of a visited primary secondary cell of UE
      start time//start time of the visited primary secondary cell of the UE
   }
```

It should be understood that the indication information is understood as that the terminal device receives a message for releasing dual connectivity established by the primary cell and the primary secondary cell for the terminal device. The indication information may be an MR-DC SCG release indication.

As an example, the indication information may be carried in the visited PScell information, and an information element structure of information about a history cell is shown It should be further noted that the last visited PSCell information in the visited PSCell information list is released. After the last visited PSCell information is released, the information about the current primary cell is added to the visited cell information list (for example, a visited cell information is added, including the information about the current primary cell). Then, the information about the current primary secondary cell is added to the information about the current primary cell (for example, visited PScell information of a primary secondary cell before the primary

```
UE history information//UE history information
{
   visited cell information list//visited history cell information list, where an element in
the visited cell information list is visited cell information, that is, the visited cell information list
includes one or more pieces of visited cell information
   }
   visited cell information//visited history cell information
   {
      visited cell ID//visited cell identity
      {
         GCI//global cell identity
         PCI-arfcn//physical cell identity and frequency information
         {
            PCI//physical cell identity
            carrier Freq//carrier frequency
         }
      }
      time spent//time spent
      start time//start time
      visited PSCell information list//visited primary secondary cell information list,
where an element in the visited primary secondary cell information list is visited primary
secondary cell information, that is, the visited primary secondary cell information list includes
one or more pieces of visited PSCell information
   }
   visited PSCell information//visited primary secondary cell information
   {
      visited PSCell ID//visited primary secondary cell identity
      {
         GCI//global cell identity
         PCI-arfcn//physical cell identity and frequency information
         {
            PCI//physical cell identity
            carrier Freq//carrier frequency
         }
      }
      time spent//time spent
      start time//start time
      indication information//indicating release of a primary secondary cell of a
secondary node SN or release of a secondary node SN
   }
```

It should be noted that the foregoing information element structure does not require that the foregoing information elements appear simultaneously.

secondary cell changes is added to the visited PScell information list under the visited cell information of the current primary cell).

Optionally, in some embodiments, the terminal device separately records information about a history cell of the primary cell of the master node and information about a history cell of the primary secondary cell of the secondary node. The information about the history cell of the primary cell and the information about the history cell of the primary cell of the secondary node are described as follows, and basic meanings are the same as those described above. The terminal device does not need to record an association relationship between the primary cell of the master node and the primary secondary cell of the secondary node. When the primary cell of the primary node of the terminal device changes, the terminal device records previous primary cell information in the visited cell information list. When the primary secondary cell of the secondary node of the terminal device changes or is released, or the secondary node is released, the terminal device records information about a previous primary secondary cell of the secondary node in the visited PScell information list. Optionally, the information about the primary secondary cell of the secondary node includes at least one of a cell identity, duration of staying in the primary secondary cell, a start time point of entering the primary secondary cell, or information indicating release of a cell of the secondary node. Optionally, when the terminal device changes from being not connected to the secondary node to being connected to the secondary node, the information about the primary secondary cell of the secondary node may further include a time length from the last release of the secondary node (for example, when the terminal device may record information about a previous primary and secondary cell when the primary secondary cell changes, the terminal device records a time length from the last release of the secondary node). Optionally, in a possible implementation, the time length from the last release of the secondary node only needs to be recorded when a first primary secondary cell changes after the terminal device changes from being not connected to the secondary node to being connected to the secondary node. In another possible implementation, the time length from the last release the secondary node only needs to be recorded when the terminal device changes from being not connected to the secondary node to being connected to the secondary node.

An example in which the terminal device is UE is used below to list an information element structure of the information about the history cell.

```
UE history information//UE history information
{
    visited cell information list//visited cell information list, where an element in the
    visited cell information list is visited cell information, that is, the visited cell information list
    includes one or more pieces of visited cell information
    visited PSCell information list//visited primary secondary cell information list,
    where an element in the visited primary secondary cell information list is visited primary
    secondary cell information, that is, the visited primary secondary cell information list includes
    one or more pieces of visited PSCell information
}
visited cell information//visited cell information
{
    visited cell ID//visited cell identity
    {
        GCI//global cell identity
        PCI-arfcn//physical cell identity and frequency information
        {
            PCI//physical cell identity
            carrier Freq//carrier frequency
        }
    }
    time spent//time spent
    start time//start time
}
visited PSCell information//visited primary secondary cell information
{
    visited PSCell ID//visited primary secondary cell identity
    {
        GCI//global cell identity
        PCI-arfcn//physical cell identity and frequency information
        {
            PCI//physical cell identity
            carrier Freq//carrier frequency
        }
    }
    time spent//time spent
    start time//start time
    indication information//indicating release of a cell of a secondary node SN
    time out of SN//indicating time from the last release of a cell of the SN
}
```

It should be noted that the foregoing information element structure does not require that the foregoing information elements appear simultaneously.

Optionally, in a possible implementation, the terminal device may send the information about the history cell that the terminal device visits to a current master node MN, and the current master node MN forwards the information to a current secondary node SN. For details, refer to descriptions in step 1420 and step 1430.

Step 1420: The terminal device sends the information about the history cell that the terminal device visits to a current master node MN.

The terminal device may send one or more pieces of the following recorded information about the history cell to the current master node MN.

The terminal device records information about a history cell that the terminal device visits in RRC_idle.

The terminal device records information about a history cell that the terminal device visits in RRC_inactive.

The terminal device records information about a history cell of a master node MN and information about a history cell of a secondary node SN that the terminal device visits in RRC_connected.

It should be understood that the current master node MN and the master node MN that the terminal device visits in RRC_connected and that is recorded by the terminal device may be the same node, or may be different nodes. This is not specifically limited in this embodiment of this application.

It should be noted that step 1420 in FIG. 14 is optional. That is, optionally, in a possible implementation, the terminal device sends the recorded information about the history cell that the terminal device visits to the current master node MN. Optionally, in another possible implementation, the terminal device sends the recorded information about the history cell that the terminal device visits separately to the current master node MN and the current secondary node SN. The following describes in detail the another possible implementation with reference to FIG. 15. Details are not described herein again.

Step 1430: The current master node MN sends the information about the history cell that the terminal device visits to a current secondary node SN.

After receiving the information about the visited history cell of the master node MN and the information about the visited history cell of the secondary node SN that are reported by the terminal device, the master node MN may send, to the current secondary node SN, information about a history cell in which the terminal device moves and that is of one or more secondary nodes SNs, or may send, to the current secondary node SN, both information about a history cell in which the terminal device moves and that is of the master node MN and information about a history cell in which the terminal device moves and that is of one or more secondary nodes SNs.

It should be understood that the one or more secondary nodes SNs and the current secondary node SN may be the same node, or may be different nodes. This is not specifically limited in this embodiment of this application.

Optionally, in another possible implementation, the terminal device may send the information about the history cell that the terminal device visits directly to the current secondary node SN. For details, refer to the description in step 1435.

Step 1435: The terminal device sends the information about the history cell that the terminal device visits to the current secondary node SN.

In this step, the terminal device may send the information about the history cell that the terminal device visits directly to the current secondary node SN, for example, by using a signaling radio bearer 3 (SRB3). Alternatively, the terminal device may first send the information about the history cell that the terminal device visits to the current master node MN, and then the current master node MN sends the information to the current secondary node SN. For example, after the terminal device adds the information about the history cell to an RRC message sent to the current master node MN, the current master node sends the information to the current secondary node. For another example, the terminal device nests an RRC message for the current secondary node in an RRC message for the current master node MN, and the RRC message for the current secondary node carries the information about the history cell. Then, the current master node sends the RRC message for the current secondary node to the current secondary node.

Optionally, in some embodiments, the foregoing two possible implementations may coexist, or there may be only one of the implementations. This is not specifically limited in this application. For example, optionally, in another possible implementation, the terminal device sends the recorded information about the history cell that the terminal device visits separately to the current master node MN and the current secondary node SN. The following describes in detail the another possible implementation with reference to FIG. 15. Details are not described herein again.

Step 1440: It should be understood that the secondary node SN performs handover preparation based on the information about the history cell that the terminal device visits.

It should be understood that the secondary node SN may perform handover preparation based on the information about the history cell that the terminal device visits and that is of the secondary node SN. For specific descriptions of handover preparation, refer to the description in step 720. Details are not described herein again.

In this embodiment of this application, the information about the history cell that the terminal device visits and that is of the secondary node SN may better reflect a quantity of moving cells of the secondary node SN, and the secondary node SN performs handover preparation based on the information about the history cell that the terminal device visits and that is of the secondary node SN. For example, when a measurement configuration is delivered, the measurement configuration is delivered based on the information about the history cell that the terminal device visits and that is of the secondary node SN, so that measurement is more accurate.

Optionally, in some embodiments, the method shown in FIG. 14 may further include step 1450. The following describes step 1450 in detail.

Step 1450: The current master node MN sends the information about the history cell that the terminal device visits to a core network or an operation administration and maintenance (OAM) network element.

It should be understood that the OAM network element may also be referred to as a network management system.

When the terminal device is in RRC_connected, the current master node MN may notify the core network or the OAM network element of the information about the history cell that the terminal device visits, then, the terminal device returns from RRC_connected to RRC_idle, next, when the terminal device returns to RRC_connected again, the core network or the OAM network element sends the information about the history cell that the terminal device visits to the current master node MN, so that the current master node MN may perform handover based on the information about the history cell that the terminal device visits.

It may be understood that some or all of the steps in the foregoing embodiments are merely examples. Other operations or variations of various operations may be further performed in this embodiment of this application. In addition, the steps may be performed in sequences different from the sequences presented in the foregoing embodiments, and not all operations in the foregoing embodiments are necessarily to be performed.

Optionally, in some embodiments, the terminal device records information about a history cell of the master node MN and information about a history cell of the secondary node SN, and may directly notify the current secondary node SN of the information about the history cell of the secondary node SN. The following provides detailed descriptions with reference to FIG. 15.

Figure 15:
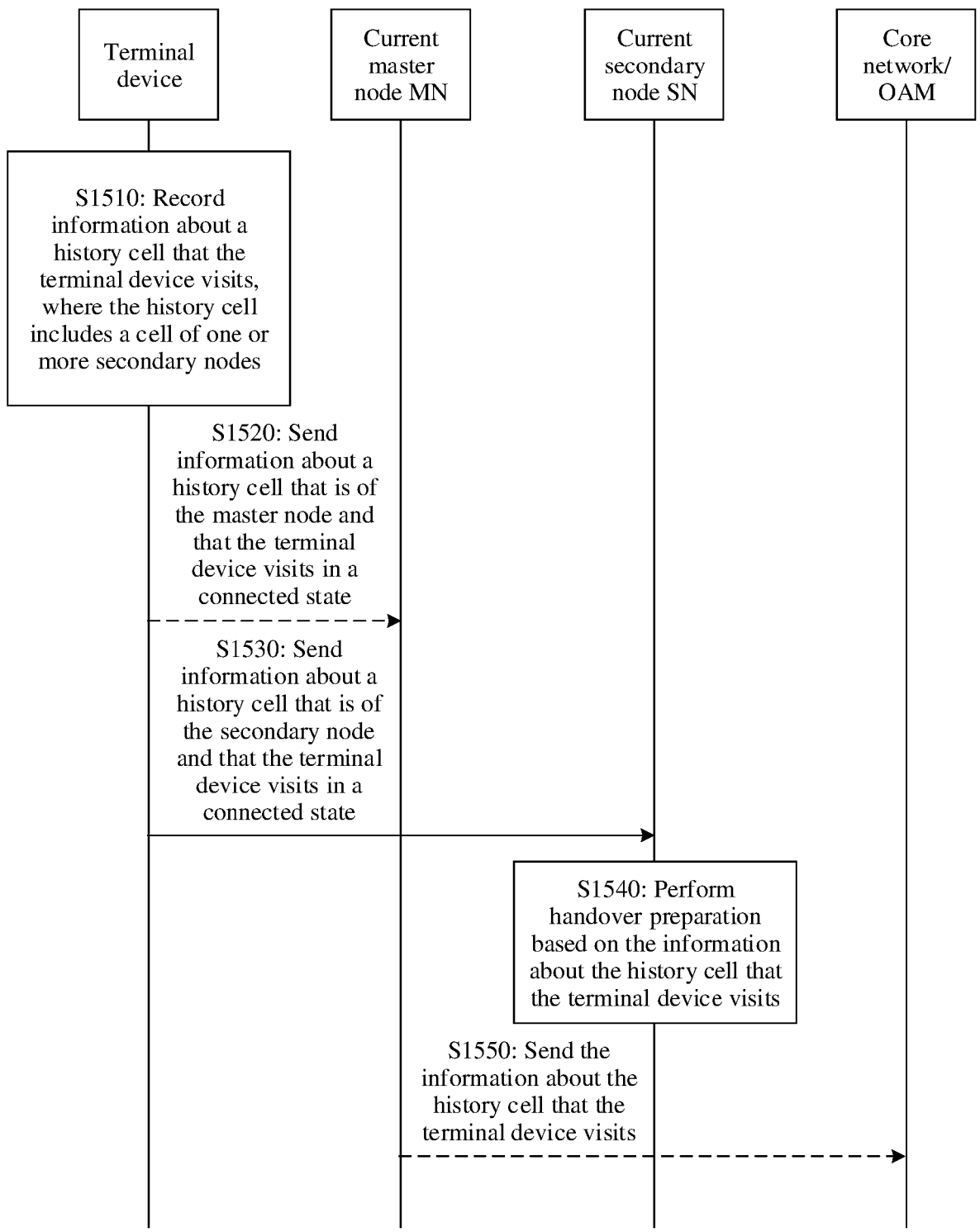
FIG. 15 is a schematic flowchart of another history information recording method according to an embodiment of this application.

FIG. 15 is a schematic flowchart of another history information recording method according to an embodiment of this application. As shown in the figure, the method includes step 1510 to step 1540. The following separately describes step 1510 to step 1540 in detail.

Step 1510: The terminal device records information about a history cell that the terminal device visits, where the history cell includes a cell of one or more secondary nodes SNs.

The step corresponds to step 1410. For details, refer to the description in step 1410, and details are not described herein again.

Optionally, in some embodiments, the method shown in FIG. 15 may further include step 1520.

Step 1520: The terminal device sends the recorded information about the history cell to the current master node MN.

Specifically, the terminal device may perform signaling transmission with the master node MN by using a first signaling radio bearer (SRB). For example, the terminal device sends the recorded information about the history cell to the current master node MN by using the first SRB. The information about the history cell may include information about a camped cell that is visited in RRC_idle/RRC_inactive and information about a primary cell of the master node that is visited in an RRC_connected state, and may further include information about a primary secondary cell of the secondary node that is visited in an RRC_Connected state. The information about the history cell may be the visited cell information list, or the visited cell information and the visited PScell information in step 1410.

The first SRB may be an SRB1 or an SRB2. After an access stratum (AS) is securely activated, a network may configure the SRB2, and the SRB2 is used to send a non-access stratum (NAS) message. A dedicated control channel (DCCH) logical channel is used. The SRB1 is used to send a radio resource control (RRC) message. It should be noted that the RRC message may include a NAS message. Alternatively, the SRB1 is used to send a NAS message before the SRB2 is established, and a DCCH logical channel is used. The priority of the SRB2 is lower than that of the SRB1.

Step 1530: The terminal device sends the information about the history cell to the current secondary node SN.

Specifically, the terminal device may perform signaling transmission with the secondary node SN by using a second SRB. For example, the terminal device sends, to the current secondary node SN by using the second SRB, the recorded information about the history cell of the secondary node SN that is visited in RRC_connected. The second SRB may be an SRB3, used to send a specific RRC message, and a DCCH logical channel is used.

For the information about the history cell, refer to related content of the information about the history cell in step 1520.

Optionally, the terminal device may first send the information about the history cell that the terminal device visits to the current master node MN, and then the master node MN sends the information to the current secondary node SN. For example, the terminal device nests an RRC message for the current secondary node in an RRC message for the current master node MN, and the RRC message for the current secondary node carries the information about the history cell. Then, the current master node sends the RRC message for the current secondary node to the current secondary node.

Step 1540: The current secondary node SN performs handover preparation based on the information about the history cell that the terminal device visits.

The secondary node SN may perform handover preparation based on the information about the history cell that the terminal device visits of the secondary node SN. For specific descriptions of handover preparation, refer to the description in step 720. Details are not described herein again.

Optionally, in some embodiments, the method shown in FIG. 15 may further include step 1550. The following describes step 1550 in detail.

Step 1550: The current master node MN sends the information about the history cell that the terminal device visits to a core network or an OAM network element.

When the terminal device is in RRC_connected, the current master node MN may notify the core network or the OAM network element of the information about the history cell that the terminal device visits, then, the terminal device returns from RRC_connected to RRC_idle, next, when the terminal device returns from RRC_idle to RRC_connected, the core network or the OAM network element sends the information about the history cell that the terminal device visits to the current master node MN, so that the current master node MN may perform handover based on the information about the history cell that the terminal device visits.

Optionally, in some embodiments, the secondary node SN may record information about a history cell that is a cell of the secondary node SN and in which the terminal device moves. Compared with that the master node MN or the terminal device records the information about the history cell that is a cell of the secondary node SN and in which the terminal device moves, that the secondary node SN records the information can greatly reflect information about a history cell that corresponds to the terminal device and that is of the secondary node SN, to greatly help the secondary node SN perform handover preparation based on the information about the history cell that is a cell of the secondary node SN and in which the terminal device moves, or without the need of depending on the information about the history cell recorded by the master node MN or the terminal device. The following provides detailed descriptions with reference to FIG. 16.

Figure 16:
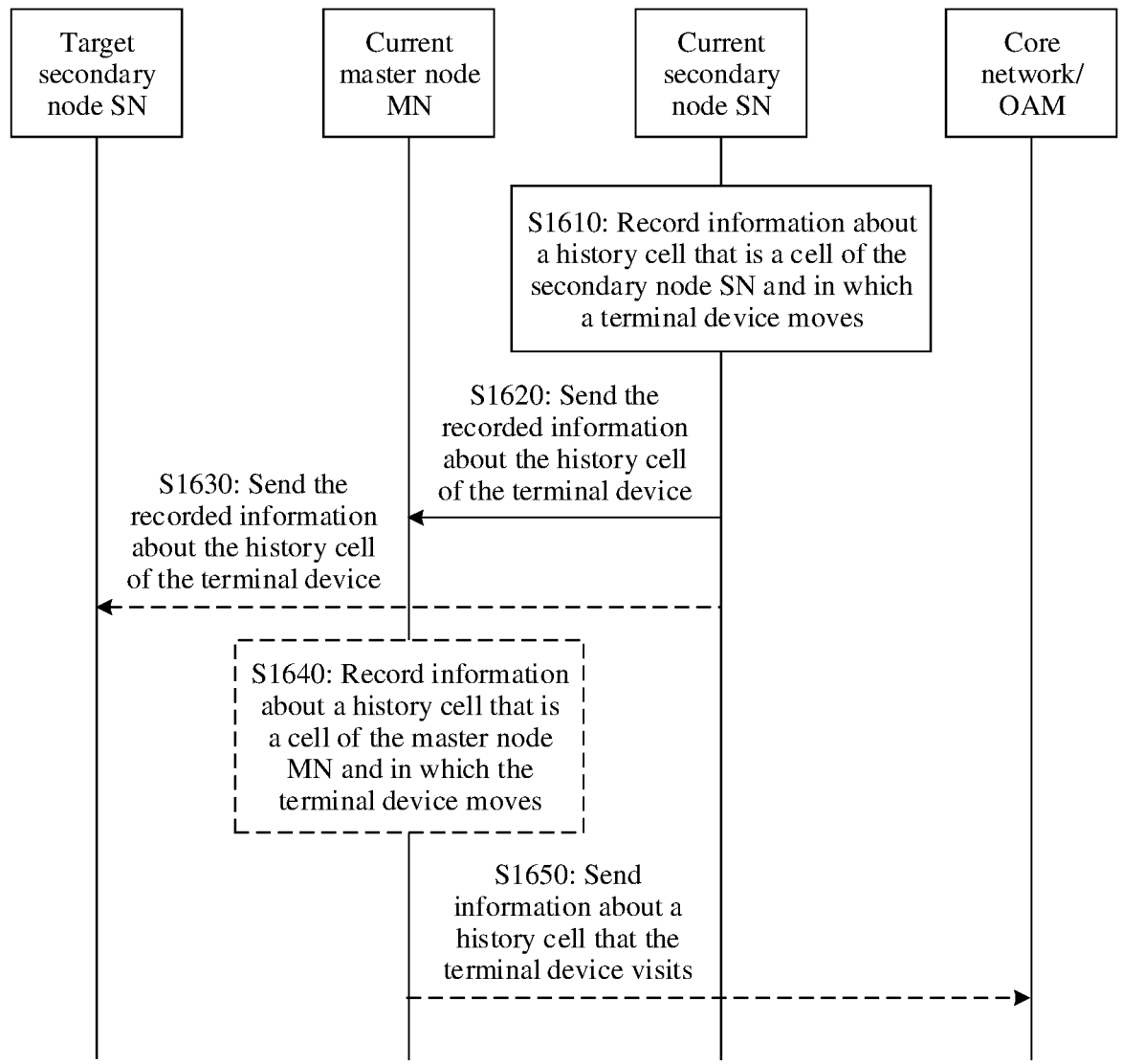
FIG. 16 is a schematic flowchart of another history information recording method according to an embodiment of this application.

FIG. 16 is a schematic flowchart of another history information recording method according to an embodiment of this application. As shown in the figure, the method includes step 1610 and step 1620. The following separately describes step 1610 and step 1620 in detail.

Step 1610: A current secondary node SN records information about a history cell that is a cell of the current secondary node SN and in which the terminal device moves.

The current secondary node SN may record the information about the history cell that is a cell of the current secondary node SN and in which the terminal device moves. It should be understood that specific content of information about a history cell that is recorded by the current secondary node SN may be similar to content recorded by the current terminal device or the master node MN. For details, refer to the description of step 710 in FIG. 7 or the description of step 810 in FIG. 8. Details are not described herein again. Optionally, the information about the history cell that is recorded by the current secondary node SN may further include a time point at which the terminal device enters a primary secondary cell of the current secondary node SN (for example, absolute time in a format of YY-MM-DD, or information about time offset relative to a time point at which the MN requests to add an SN).

An example in which the terminal device is UE is used below to list a possible information element structure of the information about the history cell that is recorded by the secondary node SN.

```
UE history information//UE history information
{
    visited PSCell information list//visited primary secondary cell information list,
where an element in the visited primary secondary cell information list is visited primary
secondary cell information, that is, the visited primary secondary cell information list includes
one or more pieces of visited PSCell information
}
visited PSCell information//visited primary secondary cell information
{
    visited PSCell ID//visited primary secondary cell identity
    {
        GCI//global cell identity
        PCI-arfcn//physical cell identity and frequency information
      {
        PCI//physical cell identity
        carrier Freq//carrier frequency
      }
    }
    time spent//time spent
    start time//start time
    absolute time//absolute time
    time migration//time offset
}
```

It should be noted that the foregoing information element structure does not require that the foregoing information elements appear simultaneously.

It should be understood that the absolute time may be absolute time at which the terminal device visits the primary secondary cell, and the time migration is time offset from a time point at which the terminal device enters a visited primary secondary cell to a time point at which the master node MN requests to add a secondary node SN.

Optionally, in some embodiments, the information about the history cell that is recorded by the current secondary node SN is a record in a primary cell of a same master node MN. When the primary cell of the master node MN changes, the current secondary node SN re-records information about a history cell in a new primary cell. That is, the information about the history cell that is recorded by the current secondary node SN is attached to a primary cell of one master node MN. For example, an attachment relationship may be reflected in a manner in which the visited cell information list includes the visited PScell information list in step 1410 in FIG. 14. For example, a visited PScell information list may be re-recorded in the visited cell information list in step 1410 in FIG. 14.

Step 1620: The current secondary node SN sends the recorded information about the history cell to a current master node MN.

In an example, when a primary cell of the current master node MN changes, the current master node MN sends indication information to the secondary node SN, where the indication information is used to indicate that the primary cell of the current master node MN changes. The current secondary node SN may report the recorded information about the history cell to the current master node MN based on the indication information. Then, the current secondary node SN re-records information about a history cell in a new primary cell of the current master node MN.

In another example, when the current master node MN is handed over, that is, when the current master node MN changes, the secondary node SN may learn that the master node MN is handed over, and the secondary node SN may actively report the recorded information about the history cell to the current master node MN. Then, the secondary node SN re-records information about a history cell in a primary cell of a new master node MN.

In another example, when the current secondary node SN changes (for example, the terminal device is handed over from a secondary node to another secondary node), the current secondary node SN actively reports the recorded information about the history cell to the current master node MN.

An association relationship between the current master node MN and the current secondary node SN may be recorded by the current master node MN, or may be recorded by the current secondary node SN. This is not specifically limited in this embodiment of this application. For example, the current master node MN sends an identity of a primary cell of the current master node MN to the current secondary node SN, and the current secondary node SN generates, based on the identity of the primary cell of the current master node MN, a correspondence between the information about the history cell that is recorded by the secondary node SN and the primary cell of the master node MN. For another example, the current secondary node SN sends, to the current master node MN, recorded information about a history cell that is a cell of the current secondary node SN and in which all terminal devices move, and the current master node MN records a correspondence between the information about the history cell and the primary cell of the current master node MN.

Optionally, in some embodiments, the method shown in FIG. 16 may further include step 1630. The following describes step 1630 in detail.

Step 1630: The current secondary node SN sends the recorded information about the history cell to a target secondary node SN.

In a scenario in which the current secondary node SN is handed over, for example, the current secondary node SN is handed over to the target secondary node SN. The current secondary node SN may be used as a source secondary node to send the recorded information about the history cell to the target secondary node SN. There are a plurality of specific implementations. This is not specifically limited in this application.

In a possible implementation, the source secondary node may directly send the recorded information about the history cell to the target secondary node. After the target secondary node receives the information about the history cell, the target secondary node needs to continue to collect information about a history cell in which the terminal device moves. In other words, the target secondary node adds, based on a record of the source secondary node, history information about movement of the terminal device in a cell within a coverage of the target secondary node. For example, history cells that are recorded by the source secondary node and in which the terminal device moves are (cell 1, cell 2, cell 3), and the target secondary node re-records cells based on the cells recorded by the source secondary node. For example, recorded history cells in which the terminal device moves are (cell 1, cell 2, cell 3, cell 4, cell 5, cell 6).

In another possible implementation, the source secondary node may send the recorded information about the history cell to the master node MN, and the master node MN forwards the information to the target secondary node. The target secondary node adds, based on the record of the source secondary node, history information about movement of the terminal device in a cell within a coverage of the target secondary node.

Optionally, after the current secondary node sends the information about the history cell to the current master node, the current master node may generate, based on the information about the history cell of the current secondary node and the information about the history cell associated between a previous master node and the secondary node, information about a history cell associated with a new master node and the secondary node. For example, the current master node may generate, based on time information in the information about the history cell that is sent by the current secondary node, information about a history cell associated with a new master node and the secondary node. Optionally, the current master node may send the information about the history cell associated with the new master node and the secondary node to the target secondary node.

Optionally, in some embodiments, the method shown in FIG. 16 may further include step 1640. The following describes step 1640 in detail.

Step 1640: The current master node MN records information about a history cell that is a cell of the current master node MN and in which the terminal device moves.

For specific content of the information about the history cell, refer to the description of step 710 in FIG. 7 or the description of step 810 in FIG. 8. Details are not described herein again.

---

UE history information//UE history information
{
    visited cell information list//visited history cell information list of UE, where an element in the visited cell information list is visited history cell information (visited cell information), that is, the visited cell information list includes one or more pieces of visited cell information
}
    visited cell information//specific content of a visited history cell of the UE
    {
        visited cell ID//visited history cell identity (identification, ID) of the UE
        {
            GCI//global cell identity of the visited history cell of the UE
            PCI-arfcn//physical cell identity and frequency information of the visited history cell of the UE
            {
                PCI//physical cell identity of the visited history cell of the UE
                carrier Freq//carrier frequency
            }
        }
        time spent//time spent of the visited history cell of the UE
        start time//start time of the visited history cell of the UE
}

---

It should be noted that the foregoing information element structure does not require that the foregoing information elements appear simultaneously.

Optionally, in some embodiments, step 1630 and step 1640 may exist at the same time, or do not need to exist at the same time.

It should be noted that, in this embodiment of this application, in a scenario in which a primary secondary cell of the secondary node SN is associated with a primary cell of the master node MN, when the master node MN or the secondary node SN records information about a history cell of the terminal device, when a quantity of primary cells in a primary cell list reaches the maximum quantity, a message of the earliest cell in the list can be deleted in a record sequence. Optionally, all primary secondary cells in a primary secondary cell list corresponding to the primary cell are deleted at the same time. When a quantity of secondary serving cells in a secondary serving cell list reaches the maximum quantity, a base station may delete a message of the earliest cell in a primary secondary cell list under the current primary cell in the record sequence.

Optionally, in some embodiments, the method shown in FIG. 16 may further include step 1650. The following describes step 1650 in detail.

Step 1650: The current master node MN sends the information about the history cell that the terminal device visits to a core network or an OAM network element.

When the terminal device is in RRC_connected, the current master node MN may notify the core network or the OAM network element of the information about the history cell that the terminal device visits, then, the terminal device enters RRC_idle from the RRC_connected state, next, when the terminal device returns to RRC_connected again, the core network or the OAM network element sends the information about the history cell that the terminal device visits to the current master node MN, so that the current master node MN may perform handover based on the information about the history cell that the terminal device visits.

Optionally, the current master node MN may further combine information about history cells that are SN cells of each MN based on information about a history cell that is stored by the current master node MN and information about a history cell that is fed back by the current secondary node SN.

It may be understood that some or all of the steps in the foregoing embodiments are merely examples. Other operations or variations of various operations may be further performed in this embodiment of this application. In addition, the steps may be performed in sequences different from the sequences presented in the foregoing embodiments, and not all operations in the foregoing embodiments are necessarily to be performed.

Optionally, in some embodiments, the core network may perform user congestion related analysis based on the information about the history cell of the terminal device or the information about the history cell of the terminal device that is obtained by the core network from another entity such as a network management system. The core network may receive the information about the history cell of the terminal device from a base station, or obtain the information about the history cell from the terminal device, or obtain the information about the history cell of the terminal device from another entity such as an OAM. The information about the history cell includes information about a history cell of a master base station node MN and/or information about a history cell of a visited secondary node SN.

It should be understood that the core network may perform congestion analysis based on a request. The analysis may be a request for congestion analysis in an area, or may be a congestion analysis based on a terminal device ID in an area in which the terminal device is located at a current moment at which the analysis is requested. Based on the request, the core network may alternatively perform congestion analysis on a user plane, or congestion analysis on a control plane, or congestion analysis on data sent by using a control plane, or analysis on a user plane, a control plane, and data sent by using a control plane. In addition, a threshold may be indicated. When a congestion level exceeds the threshold, a network data analysis function (NWDAF) provides a corresponding analysis result.

Specifically, the core network may obtain corresponding output analytics based on input data information. For details about the input data information collected y the NWDAF, see Table 1. For details about the congestion analysis output by the NWDAF, see Table 2.

TABLE 1

| Input data information | | |
|---|---|---|
| Information | Source | Description |
| UE location information (UE location) | Mobile access management function (AMF) | UE location information that may be provided to the NWDAF when the NWDAF is used derives the area of interest (UE location information that may be provided to the NWDAF when the NWDAF is used derive the area of interest) |
| AMF identifier (AMF ID) | Unified data management (UDM) | The AMF ID to be used for obtaining the UE's location (The AMF ID to be used for obtaining the UE's location) |

TABLE 1-continued

| Input data information | | |
|---|---|---|
| Information | Source | Description |
| Performance measurements | OAM | Performance measurements are some performance measurement results obtained by the NWDAF from the OAM to analyze the congestion level, and mainly include some indexes of a user plane and a control plane |
| DC capability of a terminal device and history information of a master node and/or a secondary node | AMF or OAM | The terminal device has a DC capability and cell movement history information of the terminal device |

It should be noted that the performance measurements in Table 1 are mainly measurement results of a minimization of drive tests (MDT) technology obtained by the OAM or a statistical quantity obtained by the OAM. A basic idea of the MDT is that an operator replaces some conventional drive test work with measurement reporting that is performed by a commercial terminal of a subscribed user, to automatically collect terminal measurement data, to detect and optimize a problem and a fault in a wireless network. Application scenarios of the technology are as follows: an operator usually performs routine network coverage drive tests every month, and also performs call quality drive tests in specific areas to address user complaints. The MDT can be used to replace the drive tests in these scenarios. Measurement types of the conventional MDT technology may be classified into the following types:

1. Signal level measurement: UE measures a signal level of a radio signal, and reports a measurement result to a base station or a base station controller.

2. Quality of service (Qos) measurement: Generally, a base station performs Qos measurement (for example, measurement of a service traffic, service throughput, and service delay), or a terminal device may perform, for example, an uplink processing delay, or a base station and a terminal device may jointly perform, for example, air interface delay measurement (measuring duration from a time point at which a data packet passes through a service data adaptation protocol (SDAP) or packet data convergence protocol (PDCP) layer of the base station to a time point at which the data packet reaches an SDAP/PDCP layer of the terminal device).

3. Accessibility measurement: A terminal device records radio resource control (RRC) connection setup failure information, and reports the information to a base station or a base station controller.

TABLE 2

| Congestion analysis output by the NWDAF | |
|---|---|
| Information | Description |
| Area of interest | For example, area information of the analysis is indicated by using a tracking area identity or a cell identity |
| Analytics | |
| Type | A type of the analysis is used to indicate analysis on a user plane, a control plane, or data sent by using a control plane |

TABLE 2-continued

Congestion analysis output by the NWDAF

| Information | Description |
| --- | --- |
| Applicable time window | The applicable time window of the analysis is used to indicate a period corresponding to an analysis result |
| Network status indication (network status indication, NSI) | Network status indication of the analysis is used to indicate a congestion level |

Figure 17:
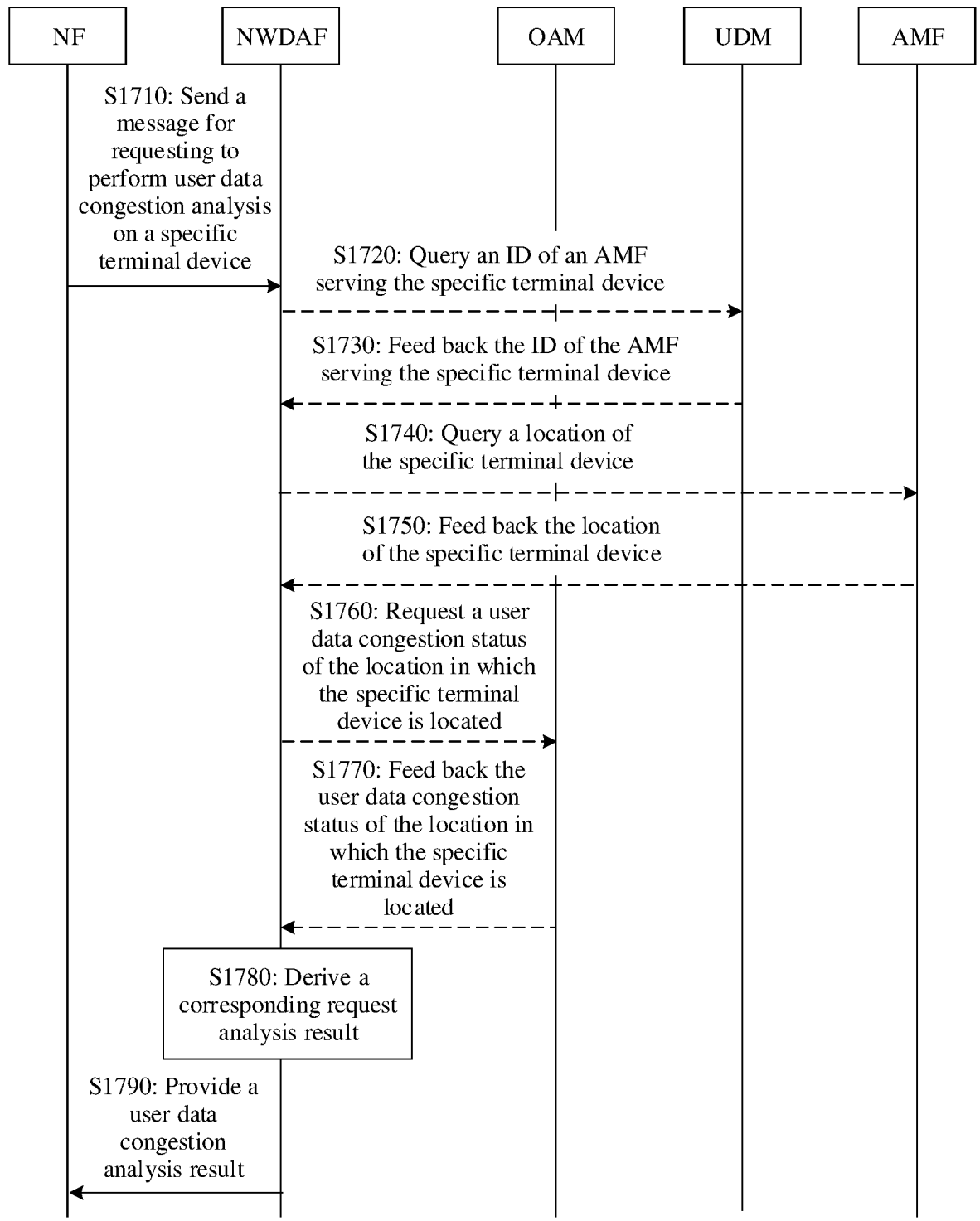
FIG. 17 is a schematic flowchart of a congestion analysis method according to an embodiment of this application.

Using an example in which congestion analysis is performed on a specific terminal device, with reference to FIG. 17, the following describes in detail a specific implementation process in which a core network performs user congestion related analysis after receiving information about a history cell of the terminal device.

FIG. 17 is a schematic flowchart of a congestion analysis method according to an embodiment of this application. As shown in FIG. 17, the method may include step 1710 to step 1790. The following separately describes step 1710 to step 1790 in detail.

Step 1710: A network function (NF) network element sends, to an NWDAF, a message for requesting to perform user data congestion analysis on a specific terminal device.

The message that is sent by the NF network element to the NWDAF and that requests to perform user data congestion analysis on a specific terminal device may carry an ID of the terminal device.

Optionally, in some embodiments, the NWDAF may not know a location of the specific terminal device, and the NWDAF may obtain the location of the terminal device based on information about a history cell of the terminal device that is obtained from an AMF or an OAM. For example, based on time information in the information about the history cell (for example, a time point of entering the history cell and duration of staying in the history cell), the location information of the current terminal device is derived, for example, a cell identity of a corresponding primary cell or a primary secondary cell.

Optionally, in some embodiments, the NWDAF may not know a location of a specific terminal device, and the NWDAF may obtain the location of the terminal device by using step 1720 to step 1750.

Step 1720: The NWDAF queries, from a UDM, an ID of an AMF serving the terminal device.

The NWDAF may send a request message to the UDM, and the request message is used to query, from the UDM, an AMF serving the terminal device.

Step 1730: The UDM feeds back, to the NWDAF, the ID of the AMF serving the terminal device.

After receiving the query message sent by the NWDAF, the UDM may feed back, to the NWDAF, the ID of the AMF serving the terminal device.

Step 1740: The NWDAF sends, to the AMF, a request for querying a location of the terminal device.

After receiving the ID that is of the AMF serving the terminal device and that is fed back by the UDM, the NWDAF may send, to the AMF, the request for querying the location of the terminal device.

Step 1750: The AMF feeds back the location of the terminal device to the NWDAF.

After receiving request information sent by the NWDAF for querying a location of a specific terminal device, the AMF may send the location of the specific terminal device to the NWDAF.

Optionally, based on the information about the history cell of the terminal device and a DC capability of the terminal device, the AMF may obtain a current possible primary cell of a master node and a primary secondary cell of a secondary node of the terminal device, and may send the primary cell and the primary secondary cell of the specific terminal device to the NWDAF.

Step 1760: The NWDAF requests, from the OAM, a user data congestion status of the location in which the specific terminal device is located.

Step 1770: An OAM feeds back, to the NWDAF, the user data congestion status of the location in which the specific terminal device is located.

Optionally, in some embodiments, if the NWDAF already has the user data congestion status, step 1760 and step 1770 may be omitted.

Step 1780: The NWDAF derives a corresponding request analysis result.

Step 1790: The NWDAF provides a user data congestion analysis result to the NF.

Optionally, in some embodiments, the core network may further analyze a potential qos change based on the information about the history cell of the terminal device. The core network may receive the information about the history cell of the terminal device from a base station, or obtain the information about the history cell from the terminal device, or obtain the information about the history cell of the terminal device from another entity such as an OAM. The information about the history cell includes information about a history cell of a master base station node MN and/or information about a history cell of a visited secondary node SN.

Specifically, the core network analyzes the potential qos change based on an input qos requirement (for example, a standard 5QI or a non-standard qos parameter), location information (for example, a path of interest, or a geographic area form (for example, area coordinates, or polygon description of an area)), and some index thresholds (for example, average uplink throughput or average downlink throughput) for triggering a qos change notification. Optionally, an interval for indicating to notify a potential qos change is further included. When a corresponding condition is met, a corresponding qos change notification is triggered. The notification may indicate location information corresponding to the qos change, time information of the qos change, and the like. For input data currently utilized by the NWDAF (that is, congestion analysis is performed by using statistics data), refer to Table 3.

TABLE 3

Data collected for analyzing a potential qos change

| Information | Source | Description |
| --- | --- | --- |
| Average bit rate of a non-guaranteed bit rate (non-GBR) of UE | OAM | Average rate of the UE corresponding to each time period, each cell, each 5QI, and each handover type obtained from the OAM |
| Average failure rate of a GBR | OAM | Average rate of the UE corresponding to each time period, each cell, each 5QI, and each handover type obtained from the OAM |

Each time period is a statistical interval corresponding to an OAM statistic defined by an operator, and an output result of potential qos change analysis is corresponding information about a location and time when a potential qos change occurs.

It should be understood that the foregoing potential qos change analysis is applicable to a vehicle to everything (V2X) scenario. Herein, "X" in V2X represents different communications targets, and V2X may include but is not limited to vehicle to vehicle (vehicle to vehicle, V2V), vehicle to infrastructure (V2I), vehicle to network (V2N), and vehicle to pedestrian (V2P).

A V2X service may be provided in two manners: a PC5 interface based manner and a Uu interface based manner. A PC5 interface is an interface defined based on a sidelink (sidelink). Through such an interface, communications devices (for example, vehicles) may directly communicate with each other. The PC5 interface may be used out of coverage (0° C.) and in coverage (in coverage, IC), but only an authorized communications device can use the PC5 interface for transmission.

In this application, the V2X sidelink transmission supports two resource allocation modes: a scheduling mode (which may be referred to as a mode 3 or a mode 1) and a UE autonomous resource selection mode (which may be referred to as a mode 4 or a mode 2).

In the scheduling mode, the UE needs to be in a radio resource control (RRC) connected mode. In a scheduling process, the UE first requests a resource from an access device (for example, an eNB), and then the access device allocates control and data resources on the V2X sidelink. By way of example and not limitation, in this application, scheduling in the scheduling mode may include semi-persistent scheduling (semi-persistent scheduling, SPS).

In addition, in the UE autonomous resource selection mode, the UE selects a transmission resource and autonomously adjusts a format of transmitting control and data on the V2X sidelink.

Figure 18:
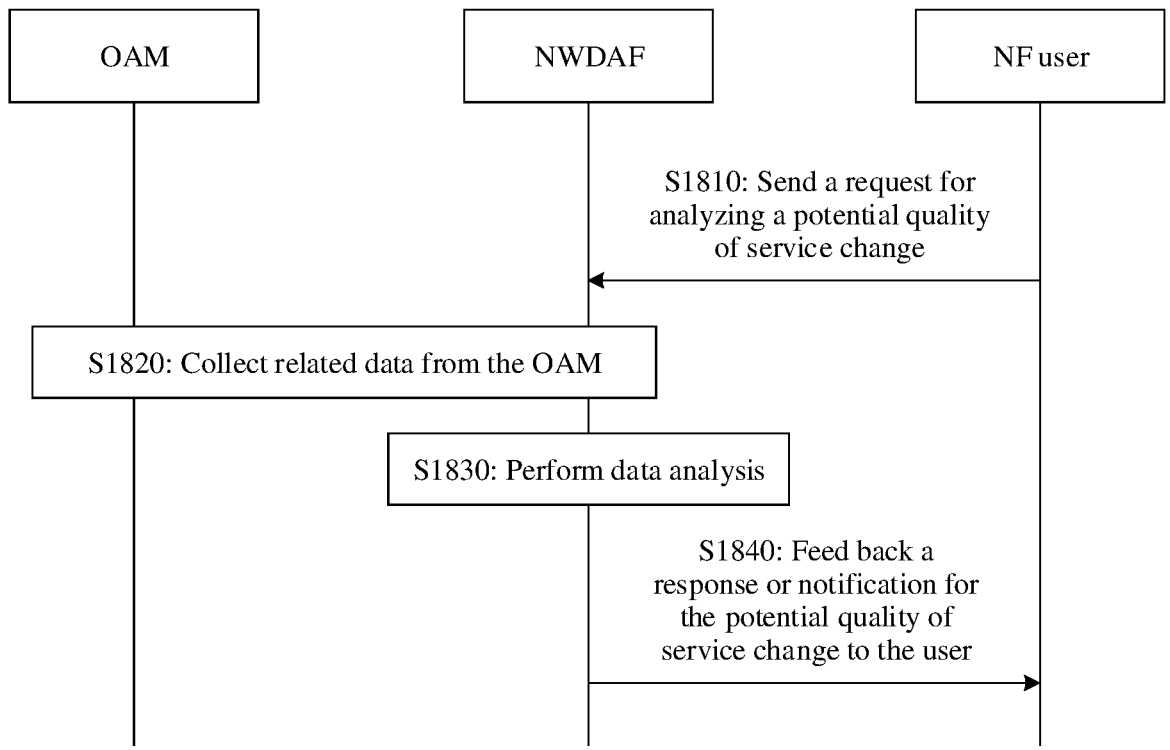
FIG. 18 is a schematic flowchart of a method for analyzing a potential qos change according to an embodiment of this application.

With reference to FIG. 18, the following describes in detail a specific implementation process in which a core network analyzes a potential qos change based on information about a history cell of a terminal device.

FIG. 18 is a schematic flowchart of a method for analyzing a potential qos change according to an embodiment of this application. As shown in FIG. 18, the method may include step 1810 to step 1840. The following separately describes step 1810 to step 1840 in detail.

Step 1810: A user sends, to an NWDAF, a request for analyzing a potential qos change.

The user may provide different sets of parameters to provide different mixed requirements for location information and time information.

Step 1820: The NWDAF collects related data from an OAM. For details, refer to the description in Table 3. Details are not described herein again.

Step 1830: The NWDAF performs data analysis.

The NWDAF verifies whether conditions for notifying the potential qos change are met. In any cell in the requested time information, the NWDAF detects, by comparing an expected key performance indicator (key performance indicator, KPI) corresponding to a target fifth generation quality of service identifier (5G Qos identifier, 5QI) with a user-provided threshold, whether a potential qos change needs to be notified. The expected KPI is derived from the statistics obtained from the OAM. If the terminal device is a terminal that supports DC, the NWDAF may estimate, based on information about a primary cell of a master node and information about a primary secondary cell of a secondary node that are in the information about the history cell of the terminal device, a possible primary cell and an associated primary secondary cell of the terminal device in the requested time information, and obtain the expected KPI by comprehensively considering data collected from the primary cell and the associated primary secondary cell that are obtained in the OAM.

The information obtained from the OAM may further include planned or unplanned endpoint detection and other information that is not within the scope of the $3^{rd}$ generation partnership project (3GPP).

Step 1840: The NWDAF feeds back a response or notification for the potential qos change to the user.

The NWDAF may provide, for the user, the response or notification for the potential qos change.

The foregoing describes in detail the history information recording method provided in the embodiments of this application with reference to FIG. 7 to FIG. 18. The following describes in detail apparatus embodiments of this application with reference to FIG. 19 and FIG. 24. It should be understood that description of the method embodiment corresponds to description of the apparatus embodiment. Therefore, for a part that is not described in detail, refer to the foregoing method embodiment.

Figure 19:
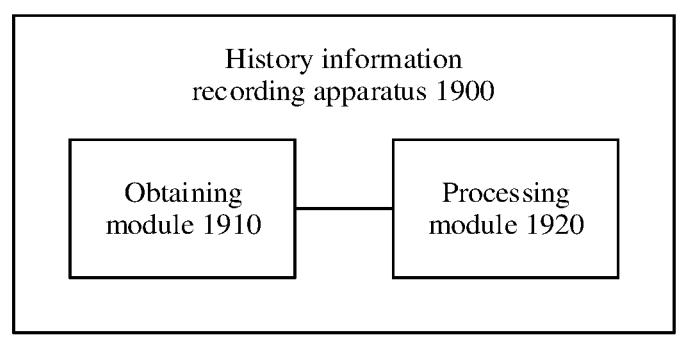
FIG. 19 is a schematic block diagram of a history information recording apparatus 1900 according to an embodiment of this application.

FIG. 19 is a schematic block diagram of a history information recording apparatus 1900 according to an embodiment of this application. It may be understood that the history information recording apparatus 1900 may be a secondary node, or may be a component that may be used in a secondary node.

The history information recording apparatus 1900 may include: an obtaining module 1910, configured to obtain information about a history cell that a terminal device visits, where the information about the history cell includes stay time of the terminal device in the history cell and/or moving speed information of the terminal device in the history cell, and a processing module 1920, configured to perform handover preparation based on the information about the history cell.

In the foregoing technical solution, the history information recording apparatus may obtain the stay time of the terminal device in the history cell and/or the moving speed information of the terminal device in the history cell, and may accurately configure some related measurement parameters based on the foregoing information, to indicate a secondary base station to trigger the terminal device to perform handover preparation.

Optionally, the obtaining module 1910 is specifically configured to receive the information about the history cell from the terminal device or a current master node.

Optionally, the history cell includes one or more history primary secondary cells, and the one or more history primary secondary cells include a primary secondary cell of one or more history secondary nodes and/or the current secondary node.

Optionally, information about the one or more history primary secondary cells is recorded by the terminal device.

Optionally, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

Optionally, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

Optionally, the information about the history cell further includes radio resource control RRC state information of the terminal device in the history cell, and the RRC state information includes a connected state, an idle state, or an inactive state.

Optionally, the history cell includes one or more history primary secondary cells, and the one or more history primary secondary cells include a primary secondary cell of one or more history secondary nodes.

Optionally, information about the one or more history primary secondary cells is recorded by the one or more history secondary nodes.

Optionally, the obtaining module 1910 is further configured to receive the information about the one or more history primary secondary cells from a current master node.

Optionally, the one or more history primary secondary cells further include a primary secondary cell of the current secondary node.

Optionally, information about the primary secondary cell of the current secondary node is recorded by the current secondary node.

Optionally, the history information recording apparatus 1900 further includes:

a sending module 1930, configured to send the information about the history cell to the current master node.

Optionally, the information about the history cell further includes RRC state information of the terminal device in the history cell, and the RRC state information includes a connected state.

Optionally, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

Optionally, the processing module 1920 is specifically configured to: based on the information about the history cell, deliver a measurement configuration or determine whether to perform handover.

Optionally, the information about the history cell further includes beam information of the terminal device in the history cell.

Optionally, the information about the history cell includes one or more of the following: a global cell identity GCI of the history cell, a physical cell identity PCI of the history cell, and a frequency of the history cell.

Figure 20:
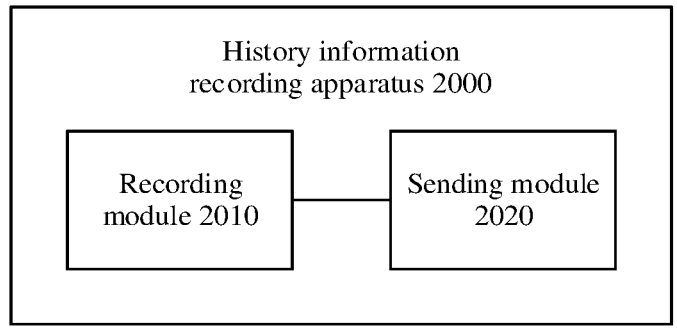
FIG. 20 is a schematic block diagram of a history information recording apparatus 2000 according to an embodiment of this application.

FIG. 20 is a schematic block diagram of a history information recording apparatus 2000 according to an embodiment of this application. It may be understood that the history information recording apparatus 2000 may be a terminal device, or may be a component that may be used in a terminal device.

The history information recording apparatus 2000 may include: a recording module 2010, configured to record information about a history cell that the terminal device visits, where the information about the history cell includes stay time of the terminal device in the history cell and/or moving speed information of the terminal device in the history cell, the history cell includes one or more history primary secondary cells, and the one or more history primary secondary cells include a primary secondary cell of one or more history secondary nodes and/or a current secondary node, and a sending module 2020, configured to send the information about the history cell to the current secondary node.

Optionally, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

Optionally, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

Optionally, the information about the history cell further includes radio resource control RRC state information of the terminal device in the history cell, and the RRC state information includes a connected state, an idle state, or an inactive state.

Optionally, the information about the history cell further includes beam information of the terminal device in the history cell.

In another possible implementation, the information about the history cell includes one or more of the following: a global cell identity GCI of the history cell, a physical cell identity PCI of the history cell, and a frequency of the history cell.

Figure 21:
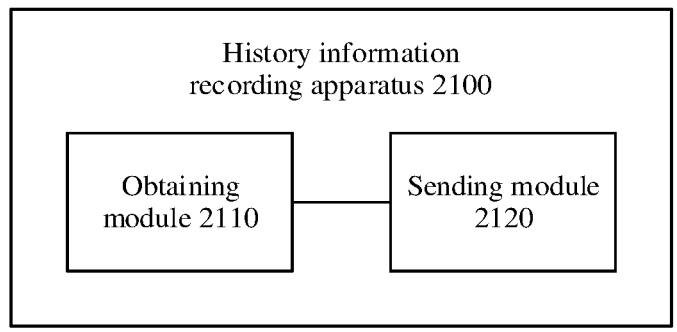
FIG. 21 is a schematic block diagram of a history information recording apparatus 2100 according to an embodiment of this application.

FIG. 21 is a schematic block diagram of a history information recording apparatus 2100 according to an embodiment of this application. It may be understood that the history information recording apparatus 2100 may be a master node, or may be a component that may be used in a master node.

The history information recording apparatus 2100 may include: an obtaining module 2110, configured to obtain information about a history cell that a terminal device visits, where the information about the history cell includes stay time of the terminal device in the history cell and/or moving speed information of the terminal device in the history cell, and a sending module 2120, configured to send the information about the history cell to a secondary node.

Optionally, the obtaining module 2110 is specifically configured to receive the information about the history cell from the terminal device.

Optionally, information about the one or more history primary secondary cells is recorded by the terminal device.

Optionally, the information about the history cell includes an association relationship between the one or more primary secondary cells and one primary cell, the terminal device accesses the primary cell when the terminal device accesses the one or more primary secondary cells, and the primary cell is a primary cell of one or more history master nodes or the current master node.

Optionally, the information about the history cell further includes indication information, where the indication information is used to indicate that the terminal device receives release information of a first secondary cell group, the first secondary cell group is a cell group of a history secondary node corresponding to a first history primary secondary cell, and the first history primary secondary cell is one of the one or more history primary secondary cells.

Optionally, the information about the history cell further includes radio resource control RRC state information of the terminal device in the history cell, and the RRC state information includes a connected state, an idle state, or an inactive state.

Optionally, the obtaining module 2110 is configured to receive the information about the history cell sent by the secondary node.

Optionally, the information about the history cell further includes beam information of the terminal device in the history cell.

Optionally, the information about the history cell includes one or more of the following: a global cell identity GCI of the history cell, a physical cell identity PCI of the history cell, and a frequency of the history cell.

Figure 22:
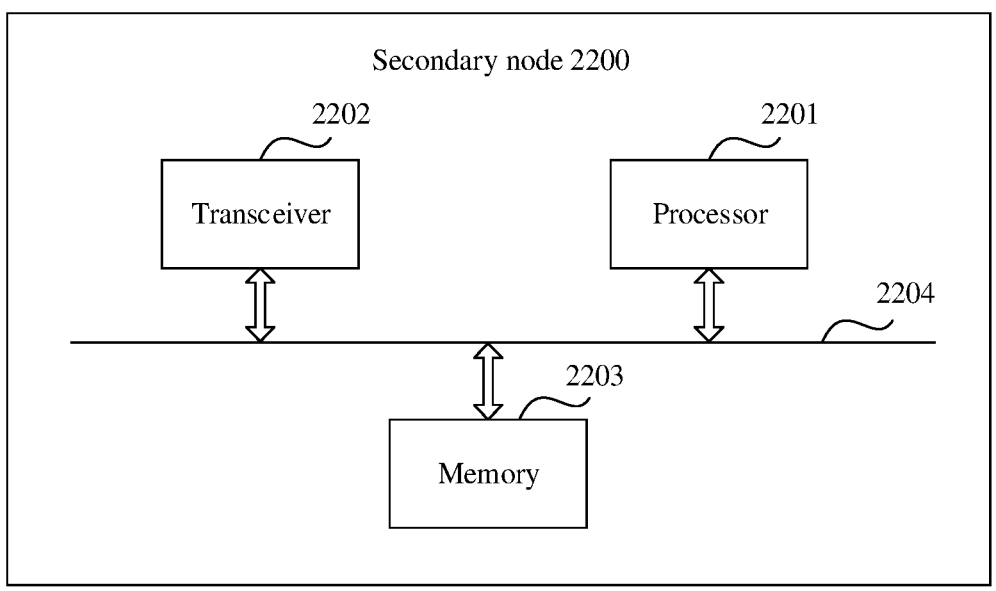
FIG. 22 is a schematic block diagram of a secondary node 2200 according to an embodiment of this application.

FIG. 22 is a schematic block diagram of a secondary node 2200 according to an embodiment of this application. The secondary node 2200 may include a processor 2201, a transceiver 2202, and a memory 2203.

The processor 2201 may be communicatively connected to the transceiver 2202. The memory 2203 may be configured to store program code and data of the secondary node 2200. Therefore, the memory 2203 may be an internal storage unit of the processor 2201, may be an external storage unit independent of the processor 2201, or may be a component including an internal storage unit of the processor 2201 and an external storage unit independent of the processor 2201.

Optionally, the secondary node 2200 may further include a bus 2204. The transceiver 2202 and the memory 2203 may be connected to the processor 2201 by using the bus 2204. The bus 2204 may be a peripheral component interconnect (peripheral component interconnect, PCI) bus, an extended industry standard architecture (extended industry standard architecture, EISA) bus, or the like. The bus 2204 may be classified into an address bus, a data bus, a control bus, and the like. For ease of representation, only one thick line is used to represent the bus in FIG. 22, but this does not mean that there is only one bus or only one type of bus.

For example, the processor 2201 may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The transceiver 2202 may be a circuit including the foregoing antenna, a transmitter chain, and a receiver chain, and may be independent circuits or a same circuit.

The transceiver 2202 may correspond to the obtaining module 1910 in FIG. 19, and the transceiver 2202 is configured to perform all steps performed by the obtaining module 1910 in FIG. 19. The processor 2201 may correspond to the processing module 1920 in FIG. 19, and the processor 2201 is configured to perform all steps performed by the processing module 1920 in FIG. 19.

It may be understood that, for functions and corresponding operations of the modules of the secondary node 2200 in this embodiment of this application, refer to related descriptions in the method embodiments. In addition, the module in this embodiment of this application may also be referred to as a unit, a circuit, or the like. This is not limited in this embodiment of this application.

Figure 23:
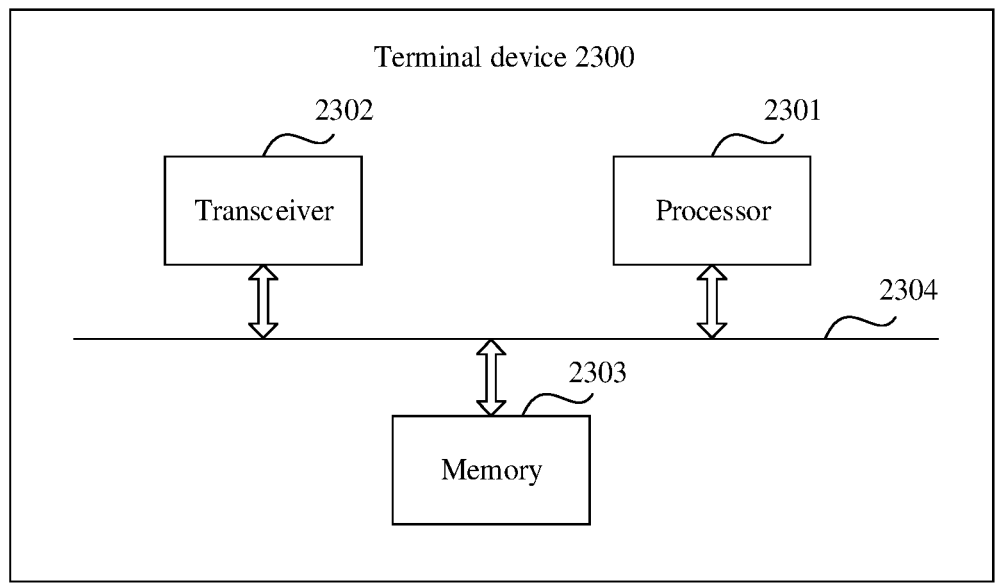
FIG. 23 is a schematic block diagram of a terminal device 2300 according to an embodiment of this application.

FIG. 23 is a schematic block diagram of a terminal device 2300 according to an embodiment of this application. The terminal device 2300 may include a processor 2301, a transceiver 2302, and a memory 2303.

The processor 2301 may be communicatively connected to the transceiver 2302. The memory 2303 may be configured to store program code and data of the terminal device 2300. Therefore, the memory 2303 may be an internal storage unit of the processor 2301, may be an external storage unit independent of the processor 2301, or may be a component including an internal storage unit of the processor 2301 and an external storage unit independent of the processor 2301.

Optionally, the terminal device 2300 may further include a bus 2304. The transceiver 2302 and the memory 2303 may be connected to the processor 2301 by using the bus 2304. The bus 2304 may be a peripheral component interconnect (peripheral component interconnect, PCI) bus, an extended industry standard architecture (extended industry standard architecture, EISA) bus, or the like. The bus 2304 may be classified into an address bus, a data bus, a control bus, and the like. For ease of representation, only one thick line is used to represent the bus in FIG. 23, but this does not mean that there is only one bus or only one type of bus.

For example, the processor 2301 may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The transceiver 2302 may be a circuit including the foregoing antenna, a transmitter chain, and a receiver chain, and may be independent circuits or a same circuit.

The processor 2301 may correspond to the recording module 2010 in FIG. 20, and the processor 2301 is configured to perform all steps performed by the recording module 2010 in FIG. 20. The transceiver 2302 may correspond to the sending module 2020 in FIG. 20, and the transceiver 2302 is configured to perform all steps performed by the sending module 2020 in FIG. 20.

It may be understood that, for functions and corresponding operations of the modules of the terminal device 2300 in this embodiment of this application, refer to related descriptions in the method embodiments. In addition, the module in this embodiment of this application may also be referred to as a unit, a circuit, or the like. This is not limited in this embodiment of this application.

Figure 24:
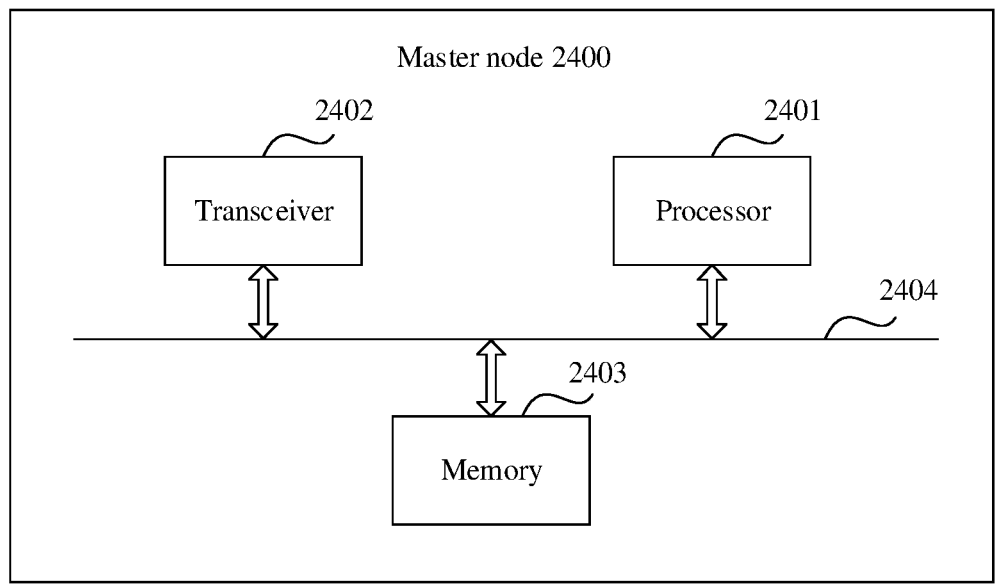
FIG. 24 is a schematic block diagram of a master node 2400 according to an embodiment of this application.

FIG. 24 is a schematic block diagram of a master node 2400 according to an embodiment of this application. The master node 2400 may include a processor 2401, a transceiver 2402, and a memory 2403.

The processor 2401 may be communicatively connected to the transceiver 2402. The memory 2403 may be configured to store program code and data of the master node 2400. Therefore, the memory 2403 may be an internal storage unit of the processor 2401, may be an external storage unit independent of the processor 2401, or may be a component including an internal storage unit of the processor 2401 and an external storage unit independent of the processor 2401.

Optionally, the master node 2400 may further include a bus 2404. The transceiver 2402 and the memory 2403 may be connected to the processor 2401 by using the bus 2404. The bus 2404 may be a peripheral component interconnect (peripheral component interconnect, PCI) bus, an extended industry standard architecture (extended industry standard architecture, EISA) bus, or the like. The bus 2404 may be classified into an address bus, a data bus, a control bus, and the like. For ease of representation, only one thick line is used to represent the bus in FIG. 24, but this does not mean that there is only one bus or only one type of bus.

For example, the processor 2401 may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The transceiver 2402 may be a circuit including the foregoing antenna, a transmitter chain, and a receiver chain, and may be independent circuits or a same circuit.

The transceiver 2402 may correspond to the obtaining module 2110 and the sending module 2120 in FIG. 21, and is configured to perform all steps performed by the obtaining module 2110 and the sending module 2120 in FIG. 21.

It may be understood that, for functions and corresponding operations of the modules of the master node 2400 in this embodiment of this application, refer to related descriptions in the method embodiments. In addition, the module in this embodiment of this application may also be referred to as a unit, a circuit, or the like. This is not limited in this embodiment of this application.

An embodiment of this application further provides a computer-readable medium, configured to store a computer program. The computer program includes instructions used to perform the method in any possible implementation of any one of the foregoing aspects.

An embodiment of this application further provides a computer program product, used in a terminal device. The computer program product includes computer program code. When the computer program code is run by a computer, the computer is enabled to perform the method in any possible implementation of any one of the foregoing aspects.

An embodiment of this application further provides a chip system, used in a communications device. The chip system includes: at least one processor, at least one memory, and an interface circuit. The interface circuit is responsible for information exchange between the chip system and an external environment. The at least one memory, the interface circuit, and the at least one processor are connected to each other by using a line. The at least one memory stores instructions. The instructions are executed by the at least one processor, to perform operations of the network element in the methods in the foregoing aspects.

An embodiment of this application further provides a computer program product, used in a communications device. The computer program product includes a series of instructions. When the instructions are run, operations of the network element in the methods in the foregoing aspects are performed.

In addition, the terms "system" and "network" are usually used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of this application, "B corresponding to A" indicates that B is associated with A, and B may be determined based on A. However, it should further be understood that determining B according to A does not mean that B is determined according to A only, that is, B may also be determined according to A and/or other information.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state disk (solid state disk, SSD)), or the like.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other similar forms.

The units described as separate parts may or may not be physically separate, and parts displayed as units may or may not be physical units, that is, may be located at one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A history information recording method for a current secondary node or a chip of the current secondary node, the method comprising:
  obtaining information about a history cell that a terminal device visits, wherein the information about the history cell comprises at least one of stay time of the terminal device in the history cell or moving speed information of the terminal device in the history cell, wherein the information about the history cell comprises an association relationship between one or more primary secondary cells and one primary cell, and wherein the terminal device accesses the primary cell when the terminal device accesses the one or more primary secondary cells; and
  performing handover preparation based on the information about the history cell.

2. The method according to claim 1, wherein the obtaining the information about the history cell comprises:
  receiving the information about the history cell from at least one of the terminal device or a current master node.

3. The method according to claim 1, wherein the history cell comprises one or more history primary secondary cells, and wherein the one or more history primary secondary cells comprise a primary secondary cell of at least one of one or more history secondary nodes or the current secondary node.

4. The method according to claim 3, wherein the information about the one or more history primary secondary cells is recorded by the terminal device or the one or more history secondary nodes or is received from a current master node.

5. The method according to claim 4 wherein the primary cell is a primary cell of one or more of one or more history master nodes or the current master node.

6. The method according to claim 1, further comprising sending the information about the history cell to a current master node.

7. The method according to claim 1, wherein the performing the handover preparation based on the information about the history cell further comprises performing at least one of:
  delivering based on the information about the history cell, a measurement configuration; or
  determining whether to perform handover.

8. An apparatus, comprising:
  at least one processor; and
  a memory storing programming, the programming including instructions that, when executed by the at least one processor, cause the apparatus to perform:
  recording information about a history cell that the apparatus visits, wherein the information about the history cell comprises at least one of stay time of the apparatus in the history cell or moving speed information of the apparatus in the history cell, wherein the history cell comprises one or more history primary secondary cells, wherein the one or more history primary secondary cells comprise a primary secondary cell of at least one of one or more history secondary nodes or a current secondary node, wherein the information about the history cell comprises an association relationship between one or more primary secondary cells and one primary cell, and wherein the apparatus accesses the primary cell when the apparatus accesses the one or more primary secondary cells; and
  sending the information about the history cell to the current secondary node.

9. The apparatus according to claim 8, wherein the sending the information about the history cell to the current secondary node comprises:
  sending the information about the history cell to a current master node (MN); and
  transparently transmitting, after the sending the information about the history cell to the MN, the information to the current secondary node by using the master node, MN.

10. The apparatus according to claim 8, wherein the primary cell is a primary cell of one or more history master nodes or a current master node.

11. A history information recording method for a current master node or a chip of the current master node, the method comprising:
- obtaining information about a history cell that a terminal device visits, wherein the information about the history cell comprises at least one of stay time of the terminal device in the history cell or moving speed information of the terminal device in the history cell; and
- sending the information about the history cell to a secondary node;
- wherein the history cell comprises one or more history primary secondary cells, and wherein the one or more history primary secondary cells comprise a primary secondary cell of at least one of one or more history secondary nodes or a current secondary node;
- wherein the information about the history cell comprises an association relationship between one or more primary secondary cells and one primary cell, and wherein the terminal device accesses the primary cell when the terminal device accesses the one or more primary secondary cells.

12. The method according to claim 11, wherein the obtaining the information about the history cell that the terminal device visits comprises:
- receiving the information about the history cell from the terminal device.

13. The method according to claim 11, wherein the primary cell is a primary cell of one or more history master nodes or the current master node.

14. The method according to claim 11, further comprising receiving the information about the history cell sent by the current secondary node.

15. The method according to claim 11, wherein the information about the history cell comprises one or more of a global cell identity (GCI) of the history cell, a physical cell identity (PCI) of the history cell or a frequency of the history cell.

16. The method according to claim 1, wherein the information about the history cell comprises information about a history cell associated with a new master node and the current secondary node, wherein the information about the history cell associated with the new master node and the current secondary node is generated based on information about a history cell of the current secondary node and information about a history cell associated with a previous master node and the current secondary node.

17. The method according to claim 11, wherein the information about the history cell comprises information about a history cell associated with the current master node and the current secondary node, wherein the information about a history cell associated with the current master node and the current secondary node is generated based on information about the history cell of the current secondary node and information about a history cell associated with a previous master node and the current secondary node.

18. The method according to claim 11, further-comprising:
- generating information about a history cell associated with a new master node and the current secondary node based on information about a history cell of the current secondary node and information about a history cell associated with a previous master node and the current secondary node.

19. The method according to claim 11, wherein information about the one or more history primary secondary cells is recorded by the terminal device or the current secondary node.

20. The apparatus according to claim 8, wherein the apparatus is a terminal device or a chip of the terminal device.

* * * * *